US006708247B1

(12) United States Patent
Barret et al.

(10) Patent No.: US 6,708,247 B1
(45) Date of Patent: Mar. 16, 2004

(54) EXTENDING UNIVERSAL SERIAL BUS TO ALLOW COMMUNICATION WITH USB DEVICES AT A REMOTE LOCATION

(75) Inventors: Dan Barret, Austin, TX (US); Mike Barron, Cedar Park, TX (US); Andrew Heller, Austin, TX (US)

(73) Assignee: ClearCube Technology, Inc., Austin, TX (US)

( * ) Notice: Subject to any disclaimer, the term of this patent is extended or adjusted under 35 U.S.C. 154(b) by 466 days.

(21) Appl. No.: 09/619,989

(22) Filed: Jul. 20, 2000

Related U.S. Application Data

(60) Provisional application No. 60/144,809, filed on Jul. 21, 1999.

(51) Int. Cl.[7] .............................................. G06F 13/00
(52) U.S. Cl. ........................ 710/313; 710/63; 710/300
(58) Field of Search ......................... 710/33, 104, 300, 710/100, 305, 313, 63, 106, 62; 714/1, 30; 709/218, 253; 370/465

(56) References Cited

U.S. PATENT DOCUMENTS

| | | | |
|---|---|---|---|
| 3,725,866 A | 4/1973 | Oldfield et al. |
| 4,484,306 A | 11/1984 | Kulczyckyj et al. |
| 4,688,246 A | 8/1987 | Eilers et al. |
| 4,885,718 A | 12/1989 | Asprey et al. |
| 5,150,243 A | 9/1992 | Suzuki |
| 5,257,390 A | 10/1993 | Asprey |
| 5,268,676 A | 12/1993 | Asprey et al. |
| 5,337,413 A | 8/1994 | Lui et al. |
| 5,347,167 A | 9/1994 | Singh |
| 5,353,409 A | 10/1994 | Asprey et al. |
| 5,428,806 A | 6/1995 | Pocrass |
| 5,479,617 A | 12/1995 | Nei |
| 5,499,377 A | 3/1996 | Lee |
| 5,550,593 A | 8/1996 | Nakabayashi |
| 5,577,205 A | 11/1996 | Hwang et al. |
| 5,598,401 A | 1/1997 | Blackwell et al. |
| 5,623,304 A | 4/1997 | Ota et al. |
| 5,675,811 A | 10/1997 | Broedner et al. |
| 5,715,410 A | 2/1998 | Kim |
| 5,721,842 A | 2/1998 | Beasley et al. |
| 5,734,834 A | 3/1998 | Yoneyama |
| 5,801,689 A | 9/1998 | Huntsman |
| 5,802,281 A | 9/1998 | Clapp et al. |
| 5,831,608 A | 11/1998 | Janay et al. |
| 5,878,271 A | 3/1999 | Crump et al. |
| 5,884,096 A | 3/1999 | Beasley et al. |
| 5,890,015 A | * 3/1999 | Garney et al. |
| 5,926,172 A | 7/1999 | Hanley |
| 5,926,509 A | 7/1999 | Stewart et al. |
| 5,948,092 A | 9/1999 | Crump et al. |
| 5,966,056 A | 10/1999 | Thornton |
| 6,006,256 A | 12/1999 | Zdepski et al. |
| 6,012,101 A | 1/2000 | Heller et al. |
| 6,012,115 A | * 1/2000 | Chambers et al. |
| 6,038,616 A | 3/2000 | Thornton et al. |
| 6,078,974 A | 6/2000 | Kirshtein |
| 6,119,146 A | 9/2000 | Heller et al. |
| 6,185,643 B1 | 2/2001 | Kirshtein et al. |
| 6,212,584 B1 | 4/2001 | Nei |
| 6,353,866 B1 | * 3/2002 | Fensore et al. |
| 6,381,666 B1 | 4/2002 | Kejser et al. |
| 6,389,029 B1 | * 5/2002 | McAlear |
| 6,571,305 B1 | * 5/2003 | Engler |
| 2002/0010821 A1 | 1/2002 | Yu et al. |

* cited by examiner

*Primary Examiner*—Gopal C. Ray
(74) *Attorney, Agent, or Firm*—Meyertons Hood Kivlin Kowert & Goetzel, P.C.; Jeffrey C. Hood

(57) ABSTRACT

System and method for communicating data over a remote Universal Serial Bus (USB) which may be used in systems wherein a host computer communicates with one or more remote USB devices. A host computer system may be coupled to a USB Remote Root Hub through a USB Extension (USBX) bus, providing the capability to control peripheral USB devices beyond the typical range of USB as specified in the USB specification. The USB Remote Root Hub may be coupled to the USB peripheral devices through the USB and may be located in the vicinity of the peripherals subject to standard USB distance limitations, and may thus be located remotely from the host.

72 Claims, 18 Drawing Sheets

EXTENDING UNIVERSAL SERIAL BUS TO ALLOW COMMUNICATION WITH USB DEVICES AT A REMOTE LOCATION

PRIORITY CLAIM

This application claims benefit of priority of U.S. Provisional Patent Application Ser. No. 60/144,809 titled "A Technique To Extend The Operating Distance Of A Universal Serial Bus", whose inventor is Andrew Heller, and which was filed Jul. 21, 1999

BACKGROUND OF THE INVENTION

1. Field of the Invention

The present invention relates generally to computer systems equipped with a universal serial bus (or "USB") for coupling peripheral devices thereto and, more particularly, to a technique which extends the distance at which the USB may operate.

2. Description of the Related Art

The Universal Serial Bus (USB) provides a method of coupling peripheral devices to a computer system. USB was developed by Intel Corporation as a general purpose port, with the intention of eliminating jumpers, IRQ settings, DMA channels, and I/O addresses. USB is a serial cable bus that supports data exchange between a host computer and a wide range of simultaneously accessible devices. The attached devices share USB bandwidth through a token scheduled protocol. The bus allows peripherals to be attached, configured, used, and detached while the host is in operation. The USB allows many (e.g., up to 127) devices to be daisy-chained with a single standard connector. USB supports devices that transfer data from 1.5 Mbps to 12 Mbps, and is expected to support transfer rates up to 480 Mbps under the USB 2.0 Protocol Specification. By continually polling the bus for devices, users may "hot-plug" peripherals into the system and use them without rebooting.

The USB technology may greatly simplify the complex cabling that typically spills out from the back of personal computers. USB peripherals may include keyboard, mouse, monitor, phone/answering machine, printer, scanner, fax/modem, ISDN, tablet, game controller, light pen, digital audio, and any other USB compliant device. The USB protocol assumes a short bi-directional connection between the local and remote ends of the USB network. The consequently short latencies for packet transmission allow the USB to be transaction oriented (e.g. token, data, and handshake are all completed before the next transaction begins) with very little performance loss.

The USB cable is a four wire cable, and the maximum cable length is about 5 meters. There are typically two connector types, and no cross-over cables and adapters are needed. The maximum USB cable length of about 5 meters results from the fact that the a USB Controller considers any transmission return time greater than a characteristic threshold value to be in error. USB cable lengths greater than about 5 meters may generate longer return times than the specified threshold value, and thus 5 meters is the maximum USB cable length. This 5 meter constraint may severely restrict the manner in which USB is used, especially given the fact that peripherals may be chained together sequentially. For example, in some situations it may be desirable to operate a USB and associated USB peripherals at a remote location from the associated host computer.

FIG. 1: A Host Computer With USB Peripherals

FIG. 1 illustrates a USB system. As FIG. 1 shows, a host computer system 108 may be coupled to various USB compliant peripherals, such as a keyboard 110A, a mouse 110B, and a monitor 110C through a Universal Serial Bus (USB) 220.

FIG. 2: A Block Diagram Of A Host Computer With USB Peripherals

FIG. 2 is a block diagram of a host computer coupled to a variety of peripheral devices through a USB. As FIG. 2 shows, the host computer system 108 may be coupled to USB compliant peripherals, including keyboard 110A, mouse 110B, and monitor 110C through Universal Serial Bus (USB) 220. Host computer 108 may include a USB Controller 230 for coupling to USB communication medium 220. Host computer 108 may be operable to send and receive data to and from the USB peripherals shown through USB Controller 230. Host computer 108 may include USB driver software 240 which interfaces to the USB Controller 230 and facilitates communication with the USB peripheral devices. As mentioned above, there is a requirement that the total USB cable length not exceed 5 meters.

FIG. 3A: USB System Software Architecture

FIG. 3A is a block diagram of the software architecture of a USB system. As FIG. 3A shows, the top layer of the software architecture is application software 302. The application software 302 may be any software program which may be operable to provide an interface for control of or communication with a USB peripheral device. A USB driver program 240 may be below the application software 302. The next software layer may be OHCI driver software 306, which interfaces with the relevant hardware; i.e., the USB Controller hardware 230. The USB Controller hardware 230 communicates through USB bus 102 to various USB peripherals 110.

FIG. 3B: USB System Software/Hardware Architecture

As FIG. 3B shows, system software 310 may include software modules that effect USB operation including client driver software 311 (which may be used by application software 302), USB driver 240, and a Universal Host Controller Driver (HCD) 306. As FIG. 3B also indicates, a hardware implementation of the system is shown in hardware 230, including Universal Host Controller (HC) 230 and USB device 110, which may be coupled by USB 102. The timing issues which result in the cable length problem exist in the host controller 230, which relies on timely acknowledgements from USB devices 110 as described in the USB specification. The host controller 312 is specified in the USB standard as having a temporal window of valid reception after each transmission between any two USB devices (controller, hubs, user devices, etc.). This period of time is 70 nanoseconds, 30 nanoseconds of which may be committed to electronic processing time in the USB Controller hardware and the other 40 nanoseconds represents the maximum time-of-flight of the data through the connecting cable. This 40 nanosecond time-of-flight issue influences the cable length limit. This timing issue is endemic to the USB process and cannot be altered. Such timing issues are described in detail below with reference to FIG. 5.

FIG. 4: USB Data Delivery Packets

The USB is a polled bus, which means the host controller initiates all data transfers. Most bus transactions involve the transmission of up to three packets. FIG. 4 is a block diagram of a typical bus transaction. Each transaction begins when the host controller, on a scheduled basis, sends a USB packet 402 describing the type and direction of transaction 410, the USB device address 412, and endpoint number 414. This packet may be referred to as the "token packet." The USB device that is addressed selects itself by decoding the appropriate address fields.

In a given transaction, data may be transferred either from the host to a device or from a device to the host. The direction of data transfer may be specified in the token packet 402. As FIG. 4 shows, the source of the transaction then sends a data packet 404 containing the data to be transferred 416 or indicates it has no data to transfer. The destination, in general, responds with a handshake packet 408 indicating whether the transfer was successful 418.

Some bus transactions between host controllers and hubs involve the transmission of four packets. These types of transactions may be used to manage the data transfers between the host and full-/low- speed devices. The USB data transfer model between a source or destination on the host and an endpoint on a device may be referred to as a pipe. There are generally two types of pipes: stream and message. Stream data has no USB-defined structure, while message data does. Additionally, pipes have associations of data bandwidth, transfer service type, and endpoint characteristics like directionality and buffer sizes. Most pipes come into existence when a USB device is configured. One message pipe, the Default Control Pipe, always exists once a device is powered, in order to provide access to the device's configuration, status, and control information. The transaction schedule allows flow control for some stream pipes. At the hardware level, this prevents buffers from underrun or overrun situations by using an acknowledgement (ACK) handshake to throttle the data rate. When acknowledged, a transaction may be retried when bus time is available. The flow control mechanism may permit the construction of flexible schedules that accommodate concurrent servicing of a heterogeneous mix of stream pipes. Thus, multiple stream pipes may be serviced at different intervals and with packets of different sizes.

FIG. 5: Time-Out Limitations Of USB

FIG. 5 illustrates the data send and acknowledgement process in a USB system as related to transmission time-outs. Referring to FIG. 5, a Data Link 504 provides a transmission medium between a Source 510 such as a USB device and a Destination 520 such as a host computer system. At time T=0 Packet 502 may be sent from the Source 510 and received at the Destination 520 at time T=A. Then, as shown in FIG. 5, at time T=B ACK 504 may be sent from the Destination 520, and received by the Source 510 at time T=C. Now, as long as C (the time of the reception of the ACK 504 from Destination 520) is less than the time-out specification of the Source 510, the Source 510 may consider the transmission transaction a success and may proceed to send the next packet of data to the Destination 520. If the timeout is exceeded the failing packet may be retransmitted by the Source 510.

Limiting the amount of time for the turnaround acknowledgment may limit the usefulness of the data exchange process in that transmission cables may be strictly limited in length to avoid time-outs. Externally increasing this timing window may result in either the ability to add the time to do processing to the data exchange chain or time to increase of the time-of-flight in the medium of the signals themselves, thus increasing the maximum cable lengths allowed by the system.

FIG. 6A: Techniques For Solving The Time-Out Problem

One approach to the time-out issues related to USB data transfers is to simply avoid violating the timing requirements, i.e., operate within the USB protocol specifications and accept the limitations. In this case the maximum Host-to-Functions (Device) distance is roughly six 5-meter cable lengths, or approximately 28 meters.

The second approach is to avoid one of the timing specifications, specifically the shorter of the two, which is the time-of-flight in the cable. This may be done by circumventing this aspect of the USB 1.0 process. Such an interface is illustrated by FIG. 6A. As FIG. 6A shows, a source local PC based Host Controller 108 may be connected through Link A 630 to a special interface 602 which fulfills all the PC's USB needs for seeing less than one data bit in the cable at a single time in Link A 630. A special Hub 604 may be located at the device end of the system which provides the same service to the UBS Devices 110 attached to the system, that is, it assures that only one bit may be in the cable at that end at one time for Link C 650. It should be noted that Link A 630 and Link C 650 may be USB compliant.

In Link B 640, which is between the Interface 602 and the Hub 604, the "one bit in the cable at one time" rule of the USB specification is not applied. Only the overall packet response time issue is of concern. The length of the Link B 640 becomes a time/length accounting issue. As FIG. 6 shows, both the Interface 602 and Hub 604 represent process delays of 40 nS. This is also true for the end USB devices 110. Each of the standard cable lengths represents about 30 nS more delay. Given that there may only be a maximum of 415 nS in travel each way, and the cables and process each way take up roughly 160 nS (30+40+40+30+20 (half of the last turn around)), approximately 255 nS remain for signal propagation through Link B 640. In a standard cable with 65% the velocity of the speed of light as a propagation rate, the maximum distance allowable for Link B is approximately 160 feet for the single run. The addition of the two 16 foot cables at each end may then permit the cable length to be expanded from about 15 feet to about 200 feet. In this way the USB rules may be violated to permit the extension of the line.

Disadvantages of the above solution include the fact that workable solutions typically involve non-standard solutions that can further exacerbate irregularities in the communications system, there may be a reduction of robustness and accuracy in the communications system, and finally, the above solution reduces the number of allowed Hubs to one from five and thus the number of USB Function Devices that the system can accommodate.

FIG. 6B: Techniques For Solving The Time-Out Problem

Other techniques for addressing the time-out problem involve the placement of several USB hubs in series. Such a configuration is shown in FIG. 6B. As FIG. 6B shows, host computer 108 may be coupled through USB to a USB hub 611A. USB hubs 611B through 611E may be connected in series through USB. USB devices 110A, 110B, and 110C may be connected to USB hub 611E. Using this technique, up to five hubs may be connected in series for a total distance of 30 meters (about 99 feet). This process, in effect, simulates additional in-line hubs allowing additional cable lengths corresponding to the process times (40 ns) of each hub. This technique has, however, two basic problems:

1. By adding hubs in series to extend the distance between the computer and the final USB hub (assumed to be the "work place" or "desk top"), the total number of USB devices that may be connected to the system may be dramatically reduced. More specifically, as a USB hub is typically an eight port unit, and USB may typically handle up to 127 USB devices, the effective capacity of the USB may be reduced by a factor of 15 to accomplish the USB cable extension process. To retain full use of the USB system may still require a limit of 16 feet on cable lengths.

2. Even if the limitation on the number of USB devices is acceptable, the maximum distance that the USB hub may be extended is still less than 100 feet.

SUMMARY OF THE INVENTION

As used herein, the term "USB Extension" may be referred to as USBX. Systems and methods described herein may be used in various types of systems wherein a host computer communicates with one or more remote external USB devices. A host computer system may be coupled to a USB Device through a USBX Controller, Extension (USBX) bus, and USB Remote Root Hub. In one embodiment, the USBX bus cable may be longer than the maximum allowed USB cable length of 5 meters, therefore providing the capability to control peripheral USB devices beyond the typical range of USB as specified in the USB protocol specification. The USB Controller may be coupled to a keyboard, mouse, and monitor through the USB. The actual number and type of peripheral devices may be different, and may include floppy drives, tape drives, CD ROMs, scanners, or other USB compliant devices.

In one embodiment, the host computer system may be a rack-mounted system in which all workstation hardware not related to the workstation's user interface, including hard drives, CPUs, motherboard, expansion cards, interface cards, etc., may be contained in a rack-mounted Personal Computer (PC) chassis, herein referred to collectively as "the host." The user interface hardware, such as keyboard, monitor, floppy drive, CD-Rom, or other user interface hardware, may be located remotely from the rack-mounted host and coupled to the host through the USB Extension (USBX) system. The user interface peripherals may be USB compliant devices which may be coupled to the USB Remote Root Hub via standard USB. The USB Remote Root Hub may be located in the vicinity of the user interface peripherals (subject, in some embodiments, to standard USB cabling distance limitations as described in the USB specification), and may thus be located remotely from the host. In another embodiment, a plurality of host computers may be rack-mounted in a central location with each host computer's user interface peripheral devices, such as keyboard, mouse, and monitor, connected to the host computer through the USBX system, thereby allowing central administration and management of the host computers while providing remote access to the host computers by users through the peripherals.

The host computer may include a specialized Host Controller, also referred to as a USBX Controller, which may be coupled to the USBX bus which may in turn be coupled to the remote USB Remote Root Hub. In one embodiment, various aspects of the invention may be implemented in the USBX Controller, the USB Remote Root Hub, and the USBX bus. In one embodiment, the USBX Controller, the USB Remote Root Hub, and the USBX bus operate together to extend the USB bus to a greater distance than that specified by the USB specification.

In one embodiment, host computer may include USB driver software to facilitate communication with the USB peripheral devices. The USBX Controller may be operable to provide a USB interface, or API (Application Programming Interface) to the USB driver software, such that the USB driver software considers the USBX Controller to be a standard USB Controller. Similarly, the USBX Controller and USBX bus may be substantially transparent to the remote USB Remote Root Hub, i.e., the remote USB Remote Root Hub may operate as if local to the host computer system.

In the USBX data delivery process, according to one embodiment, a determination may be made by the USB Remote Root Hub whether there is an incoming packet from a device, such as, for example, a USB compliant keyboard. In one embodiment, the device may be a USB Hub, or function device in a USB network. If there is an incoming packet from the device, then the packet is typically saved and a copy passed to the host. In one embodiment, the host may include the USBX Controller which receives the packet. If the packet has not been received, then the USB Remote Root Hub may continue to watch for the packet.

After the incoming packet has been received, an acknowledgement may be sent by the USB Remote Root Hub to the device signaling that the packet was received. The device considers the acknowledgement to be from the host, when in fact, it originates with the USB Remote Root Hub which is local to the device. In this manner, time-out issues associated with long distances between the device and the host may be avoided. More specifically, sending the ACK may make the device operate as if the transaction were a success, thus freeing the device to process further data. Thus the device operates as if the ACK were from the host, when in fact the USB Remote Root Hub sent the ACK.

A determination may then be made whether an acknowledgement has been received from the host, indicating that the packet was received by the host. If the acknowledgement from the host has been received, then the USB Remote Root Hub typically waits for a next incoming packet. Otherwise, the USB Remote Root Hub may check for a time-out condition.

In one embodiment, if a time-out has not occurred the USB Remote Root Hub may continue to wait for the acknowledgement from the host. If there is a time-out condition, then the transaction may be considered to have failed and the USB Remote Root Hub may resend the packet to the host.

In one embodiment, the USB Remote Root Hub may check whether the packet has been resent to the host for the third time, and if not, then the USB Remote Root Hub may continue to wait for the acknowledgement from the host. If, on the other hand, the packet has been resent to the host three times, then an error routine may be called. The error routine may reset the system for fresh data, and the transaction may be considered a failure. In one embodiment, the transaction failure may be logged and/or reported to appropriate parties.

Thus, in the process described above, the data packet may be held by the USB Remote Root Hub for possible retransmission to the host until the appropriate response is received from the host. The retransmissions to the host (in response to a reception failure) may be made independently of source (device) conditions or activity. Furthermore, the process effectively circumvents the time-out characteristic of the source return to achieve the operational characteristics of a longer source time-out interval.

In the USB system the Remote Hub typically needs to know which packets are sent to and from isochronous endpoints, which typically do not use acknowledgements at all, as they are generally streaming data such as video and it would be inappropriate for the root hub to issue an ACK to these devices. To accommodate this need, the SYNC field in USBX may be modified to include information as to whether the data are isochronous or needing an ACK. Thus, the USBX system may accommodate the transfer of both isochronous and non-isochronous data.

BRIEF DESCRIPTION OF THE DRAWINGS

Other advantages and details of the invention will become apparent upon reading the following detailed description and upon reference to the accompanying drawings in which.

Figure 1:
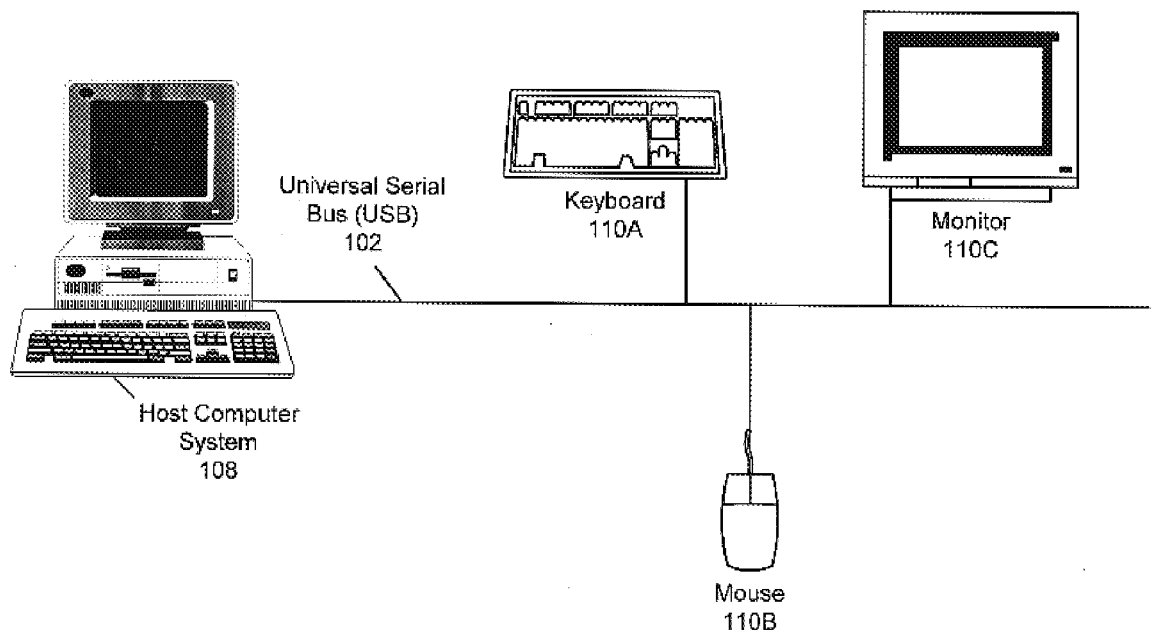
FIG. 1 illustrates a system comprising a host computer coupled to peripherals through USB.
Figure 2:
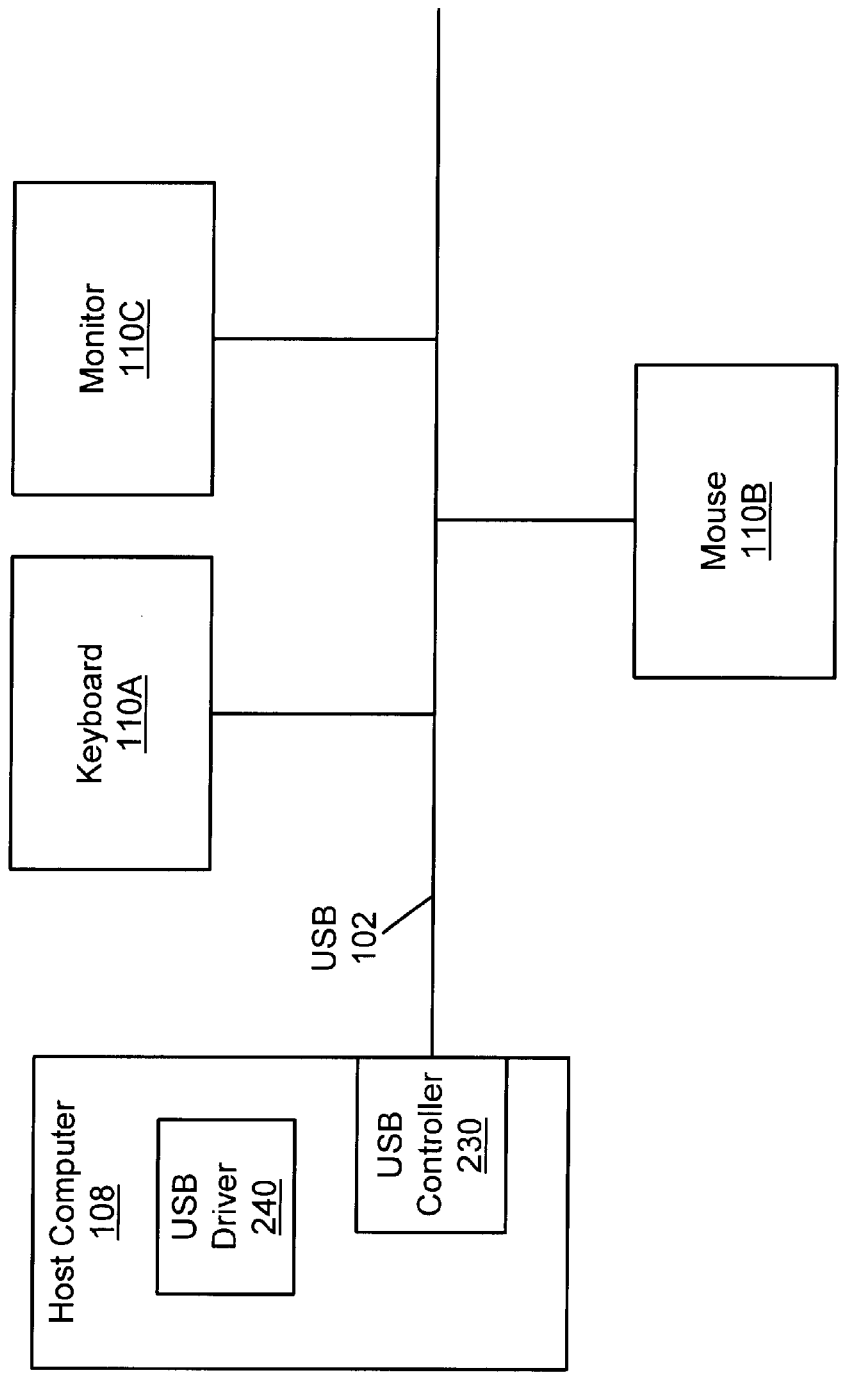
FIG. 2 is a block diagram of the system of FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

U.S. Provisional Patent No. 60/144,809 titled "A Technique To Extend The Operating Distance Of A Universal Serial Bus" is hereby incorporated by reference in its entirety as though fully and completely set forth herein.

U.S. Pat. No. 6,012,101 titled "Computer Network Having Commonly Located Computing Systems" is hereby incorporated by reference in its entirety as though fully and completely set forth herein.

U.S. patent application Ser. No. 09/179,809 titled "A Technique To Transfer Multiple Data Streams Over A Wire Or Wireless Medium" is hereby incorporated by reference in its entirety as though fully and completely set forth herein.

Figure 7:
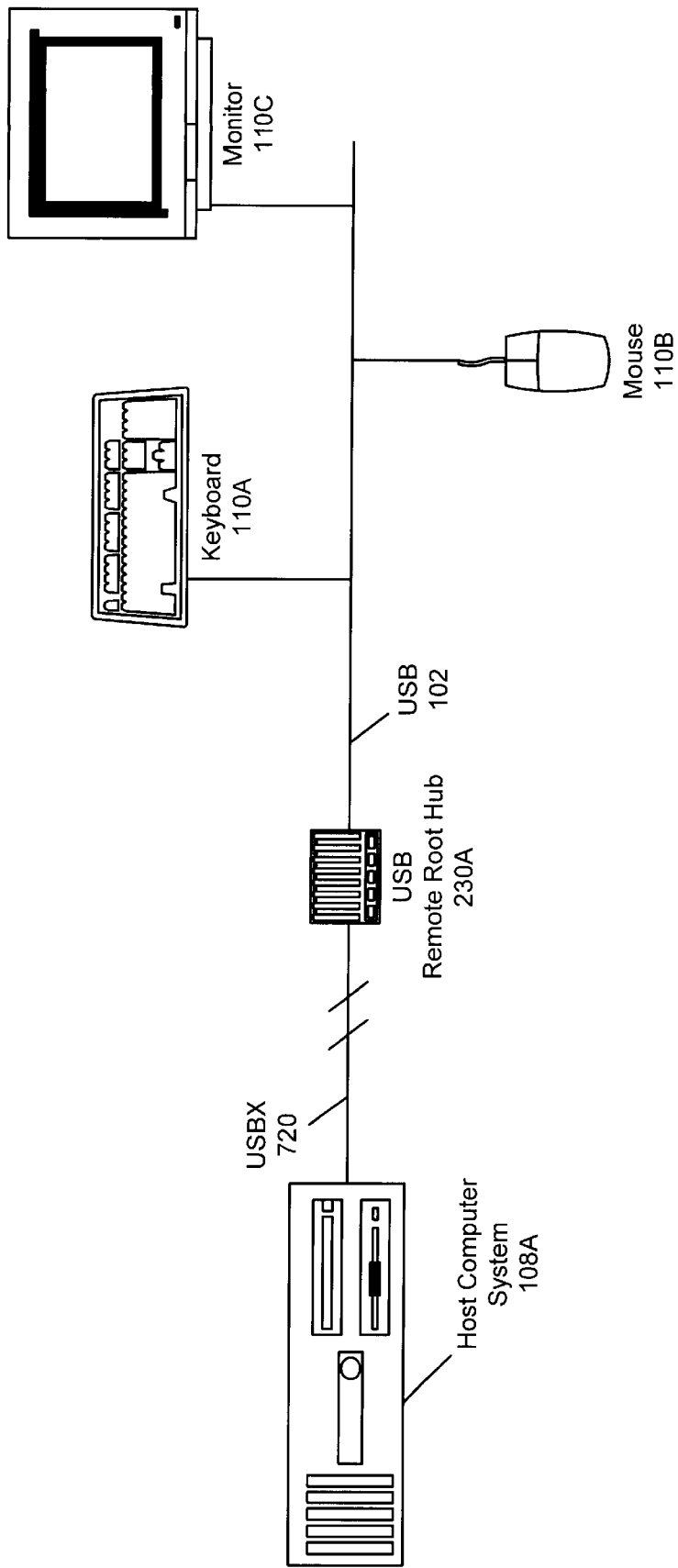
FIG. 7 illustrates a system wherein the USB bus and associated USB peripherals are located remotely from the host computer.

FIG. 7: A Host Computer Coupled To USB Peripherals Through A USB Extender

FIG. 7 illustrates a USB Extension system according to one embodiment. As used herein, the term "USB Extension" may be referred to as USBX. It is noted that systems and methods described herein may be used in various types of systems wherein a host computer communicates with one or more remote external USB devices. Host computer system 108A may contain an USBX Controller (see FIG. 8) and may be coupled to a USB Remote Root Hub 230A through a USB Extension bus 720, also referred to as a USBX bus. In one embodiment, the USBX bus may be a non-USB compliant bus that enables extension of a USB compliant bus to a greater distance from the host computer 108A than that allowed by the USB specification. Thus, in one embodiment, the cable of the USBX bus 720 may be much longer than the maximum allowed USB cable length of 5 meters, therefore providing the capability to control peripheral USB devices far beyond the typical range of USB as specified in the USB protocol specification, i.e., "the USB specification".

As can be seen in FIG. 7, the USB Remote Root Hub 230A may be located remotely from the host computer 108A. The USB Remote Root Hub 230A may be coupled to keyboard 110A, mouse 110B, and monitor 110C through the USB 102. The number and type of peripherals shown are for illustration purposes only, the actual number and type of peripheral devices may be different, and may include floppy drives, tape drives, CD ROMs, scanners, or any other USB compliant device.

In one embodiment, the invention may be implemented in a system as described in U.S. Pat. No. 6,012,101 by Heller, et al., and which is incorporated by reference above. In particular, host computer system 108A may be a rack-mounted system in which all computer hardware not related to the user interface, including hard drives, CPUs, motherboard, expansion cards, interface cards, etc., may be contained in a rack-mounted Personal Computer (PC) chassis, herein referred to collectively as "the host." In particular, as shown in FIG. 7, the user interface peripherals 110 may be USB compliant devices which may be coupled to the USB Remote Root Hub 230A via standard USB 102. The USB Remote Root Hub 230A may be located in the vicinity of the user interface peripherals subject to standard USB cabling distance limitations as described in the USB specification, and may thus be located remotely from the host 108A. The USB Remote Root Hub 230A may in turn be coupled to the host 108A through USBX bus 720. The user interface devices, such as keyboard, monitor, floppy drive, CD-Rom, or other user interface hardware, may be located remotely from the rack-mounted host 108A. The user interface devices may be thus coupled to the host 108A through the USB Extension (USBX) system. As used herein, the term "USBX system" refers to all of the components coupling the host computer to the USB devices, and may include USBX Controller 830 (see FIG. 8), USBX bus 720, USB Remote Root Hub 230A, and USB bus 102.

In another embodiment, a plurality of host computers 108A may be rack-mounted in a central location with each host computer's peripheral devices 110, such as keyboard 110A, mouse 110B, and monitor 110C, connected to the host computer through the USBX system, thereby allowing central administration and management of the host computers 108A while providing remote access to the host computers 108A by users through the peripherals 110.

Figure 8:
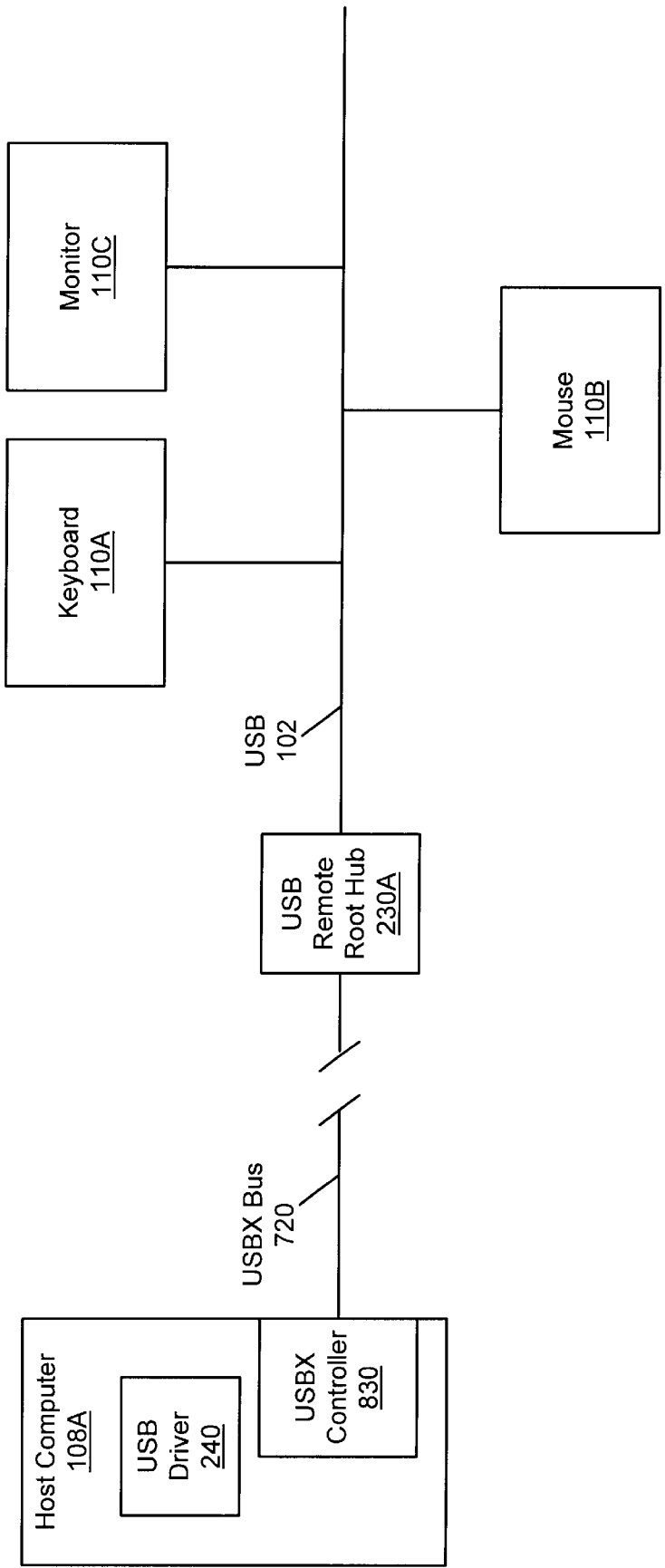
FIG. 8 is a block diagram of the system of FIG. 7.

FIG. 8: A Block Diagram Of A Host Computer Coupled To USB Peripherals Through A USB Extension System FIG. 8 is a block diagram of the system shown in FIG. 7. FIG. 8 illustrates in block diagram form the host computer system 108A coupled to the USB peripheral devices 110 mentioned above with reference to FIG. 7, including keyboard 110A, mouse 110B, and monitor 110C. Host computer 108A includes a specialized Host Controller 830, which may also be referred to as a USBX Controller 830, and which may be coupled to USBX bus 720. The USBX bus 720 may in turn be coupled to remote USB Remote Root Hub 230A. USB Remote Root Hub 230A may be coupled to the USB peripheral devices through USB 102. In one embodiment, various aspects of the invention may be implemented in the USBX Controller 830, the USB Remote Root Hub 230A, and the USBX bus 720. In other words, in one embodiment, the USBX Controller 830, the USB Remote Root Hub 230A, and the USBX bus 720 operate together to extend the USB bus to a greater distance than that specified by the USB specification.

Thus the USB Remote Root Hub 230A may not be solely a standard USB controller, but rather may include logic which may operate in extending the USB bus 102. The USB Remote Root Hub 230A appears to USB devices 110 as a standard USB host controller. The USB Remote Root Hub 230A also, however, may include additional logic which may be operable to translate USBX packets to and from USB packets according to translation rules provided below with reference to FIG. 14. A USB packet sent from a USB device may thus be translated to a USBX packet by the USB Remote Root Hub and sent over the USBX bus 720 to the Host (USBX) Controller 830. Similarly, a USBX packet received from the host (USBX) controller 830 over the USBX bus 720 may be translated to a USB packet and sent to the USB device 110 over the USB 102.

Figure 9:
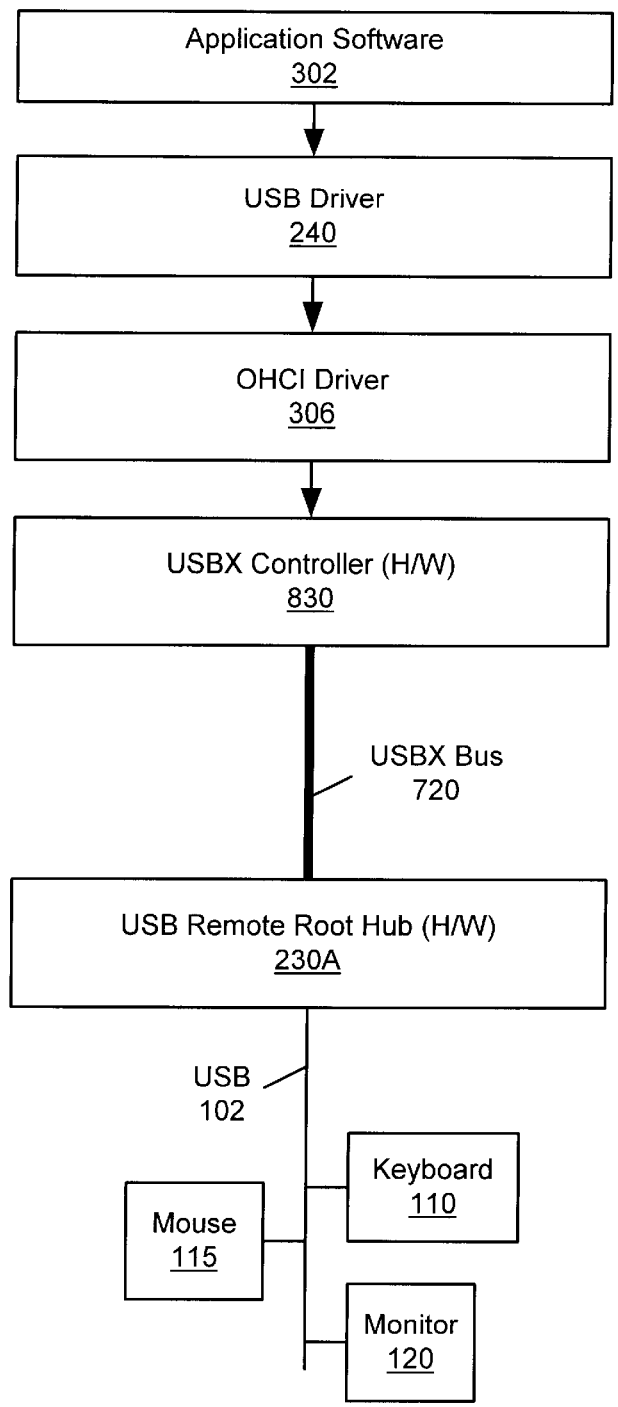
FIG. 9 is a block diagram of the software architecture of the system of FIGS. 7 and 8.

In a similar manner, the USBX Controller or host controller 830 may not be solely a standard USB host controller, but may be operable to provide a standard USB interface, or API (Application Programming Interface) to the USB Driver 240 and the driver 306, while also providing an interface to the USBX bus 720 (see FIG. 9). Thus the USB. Driver 240, and the OHCI driver 306 can operate unmodified, i.e., the USB Driver 240 and the driver 306 may not be "aware" that the USBX Controller 830 is intercepting communications between the USB Driver 240 and the USB Remote Root Hub 230. Similarly, the USBX Controller 830 allows the USB Remote Root Hub 230A to be located remotely from the host 108A, but the USB Remote Root Hub 230A remains "unaware" that the location is not local to the host 108A.

As mentioned above, the USBX bus 720 may not be a standard USB bus. The USBX bus 720 may operate to allow the communication of USBX packets between the USBX Controller 830 and the USB Remote Root Hub 230A. The USBX bus 720 does not share the cabling distance limitations of the standard USB bus 102, as described in the USB specification. As mentioned above with reference to FIG. 7, the USBX bus cable may be significantly longer than the 5 meter maximum allowed for USB bus cables as described in the USB specification.

In one embodiment the USB devices 110 may be "daisy-chained" together sequentially wherein each device includes a USB Hub for the next device to connect. In another embodiment, the USB bus 102 may be connected to a USB Hub to which the USB devices 110 may all be connected.

FIG. 9: USBX System Software Architecture

Figure 3A:
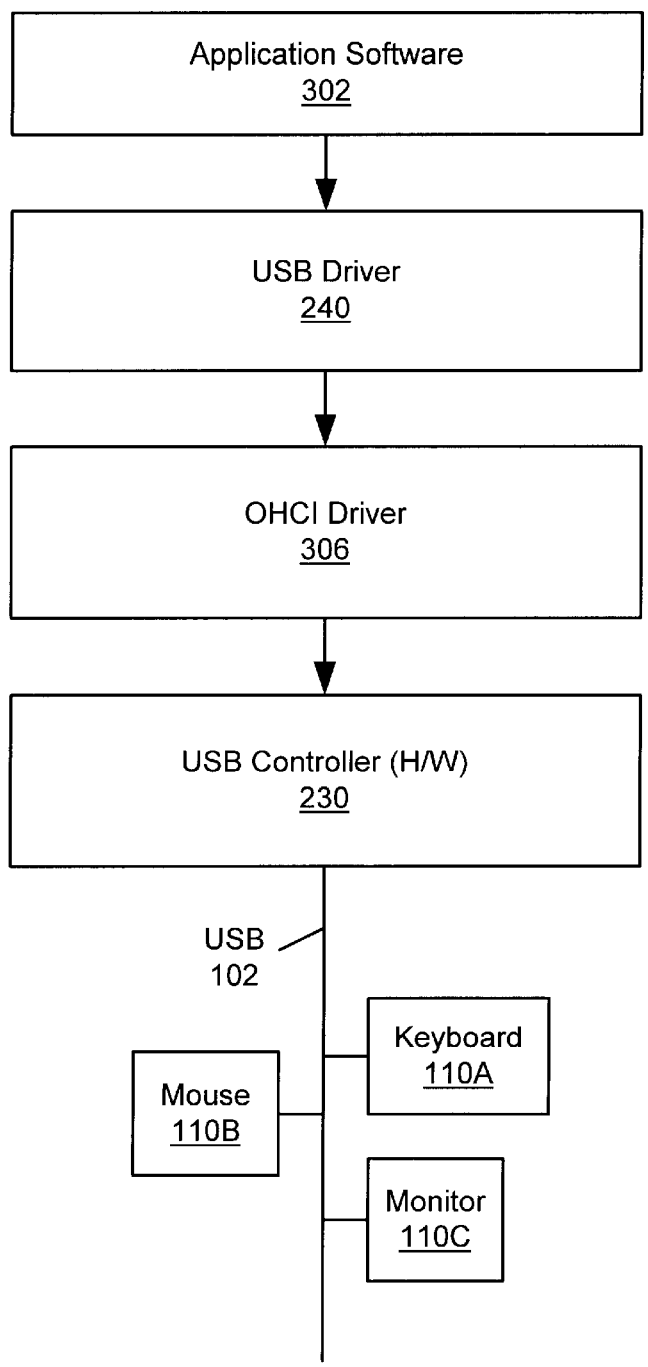
FIGS. 3A and 3B are block diagrams of the software and hardware architecture of a USB system.
Figure 3B:
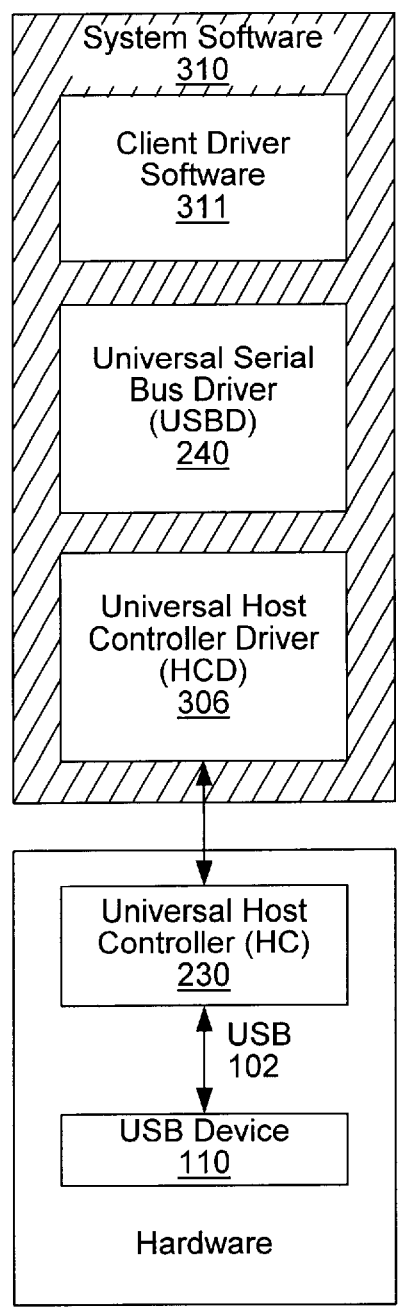
Figure 4:
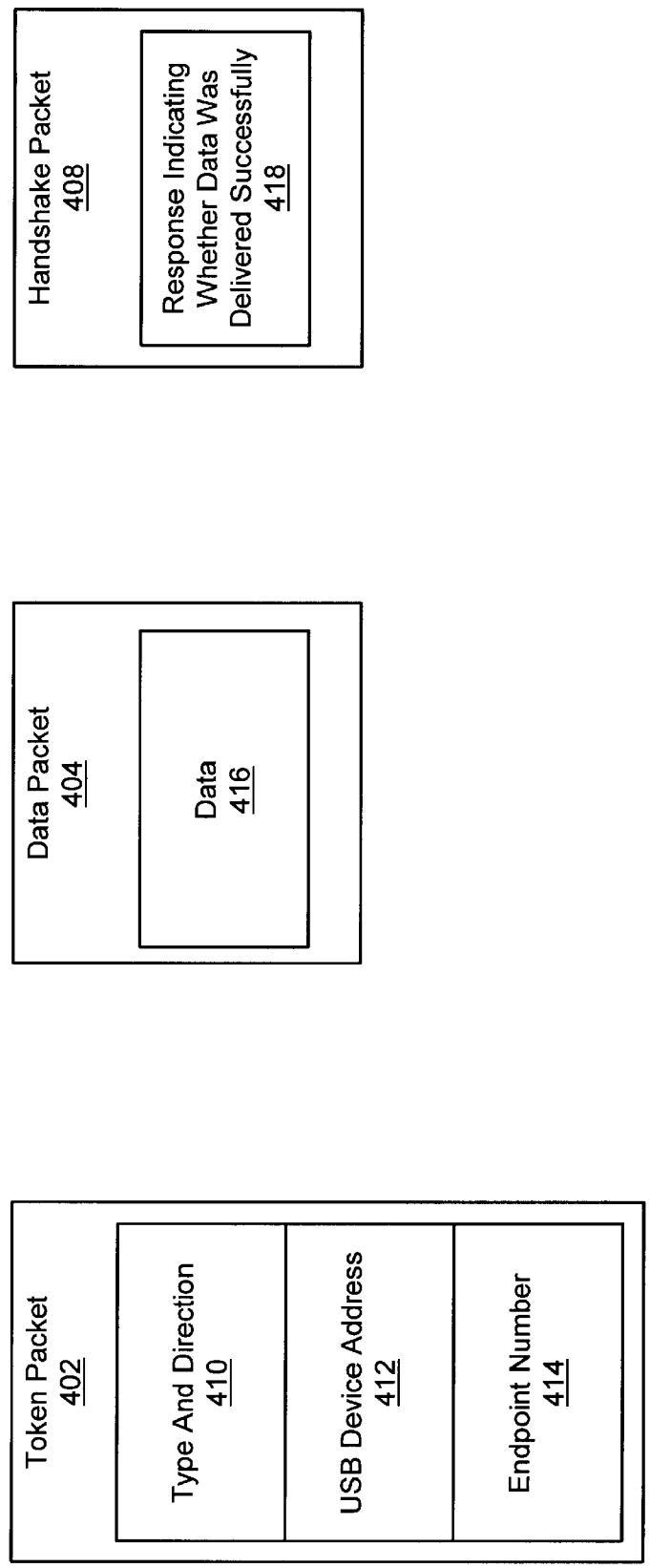
FIG. 4 is a block diagram of USB data packets.
Figure 5:
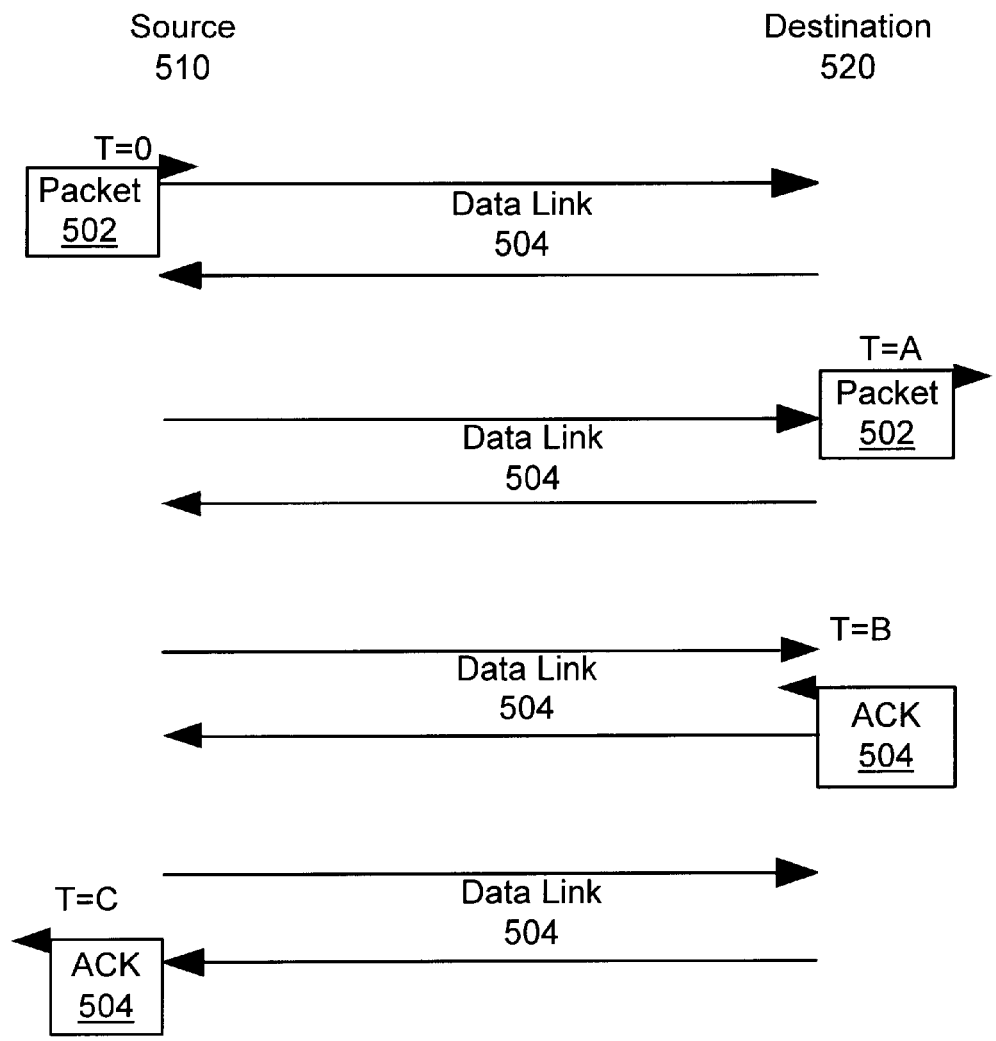
FIG. 5 illustrates time-out limitations of USB.
Figure 6A:
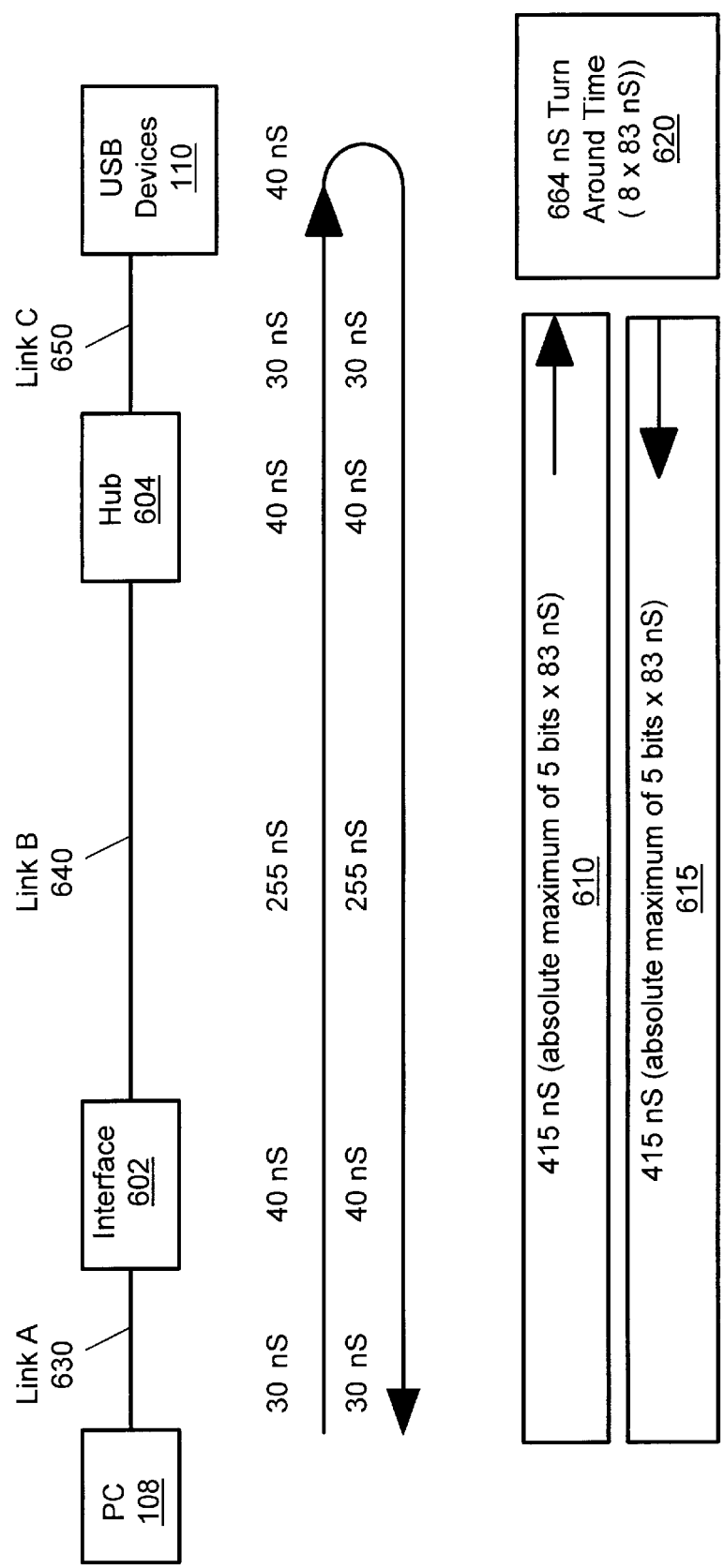
FIGS. 6A and 6B illustrate techniques for solving the USB time-out problem.
Figure 6B:
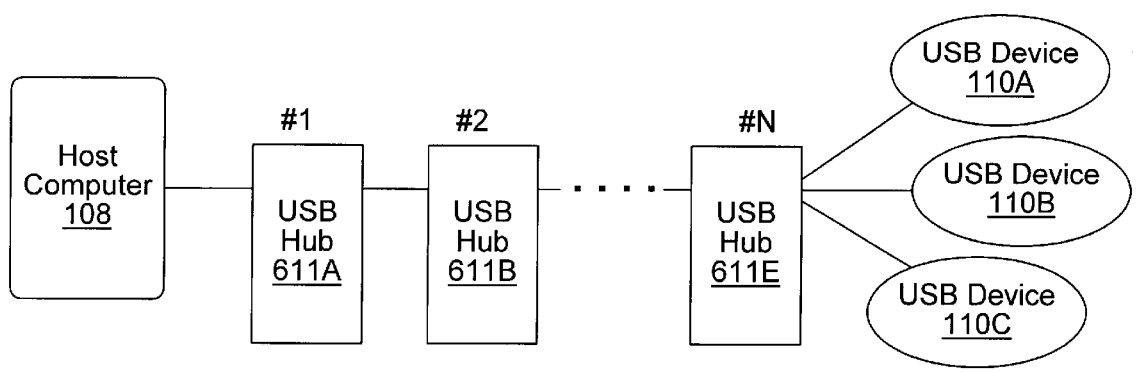

FIG. 9 is a block diagram of the software architecture of a USBX system. As described with respect to FIG. 3A, the top layer of the software architecture is application software 302. The application software 302 may be any software program which may be operable to provide an interface for control of or communication with a USB peripheral device. A USB driver program 240 which may be operable to facilitate communication with the USB peripheral devices may be below the application software 302. The next software layer may be OHCI driver software 906, which is designed to communicate with a standard USB controller. The OHCI driver may communicate with the USBX Controller hardware 830. The USBX Controller 830 may be operable to provide a standard USB interface or API (Application Programming Interface) to the layers above it, i.e., to the OHCI driver 306 and the USB driver program 240. Thus, the USB driver software 240 and the OHCI driver 306 consider the USBX Controller 830 to be a standard USB Controller. Therefore, standard prior art driver software (240 and 306) can operate unmodified. As FIG. 9 shows, the USBX Controller 830 may be coupled to the remote USB Remote Root Hub 230A through the USBX bus 720. The remote USB Remote Root Hub 230A may then be coupled through USB 102 to the USB peripheral devices mentioned above with reference to FIGS. 9 and 8, specifically, keyboard 110, mouse 115, and monitor 120. The USBX Controller 830 provides an interface to the USB Remote Root Hub 230 such that the USB Remote Root Hub 230A may operate as if local to the host computer 108A, i.e., may be "unaware" of the intervening USBX Controller 830 and USBX bus 720.

Figure 10:
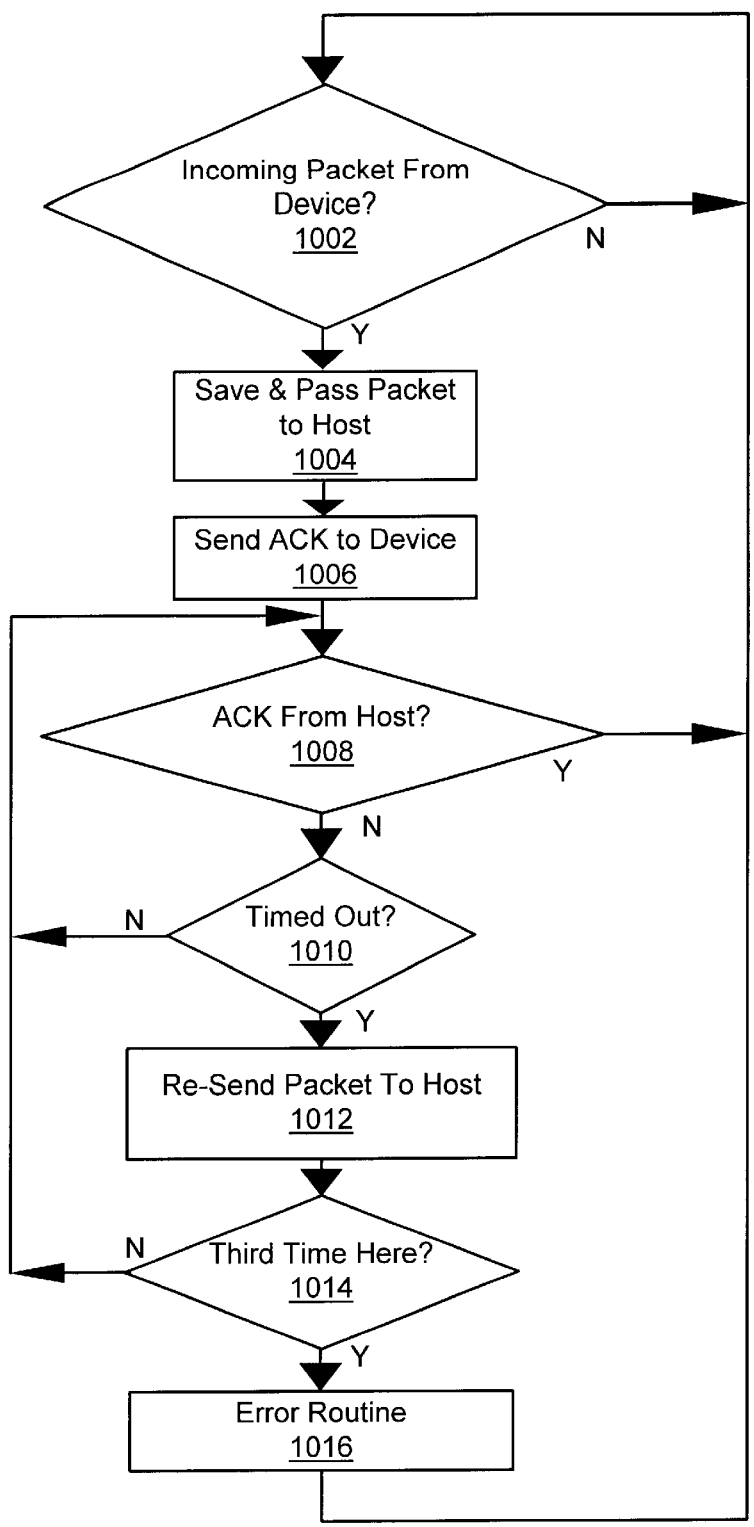
FIG. 10 is a flowchart of a USB data transfer process.

FIG. 10: USBX Data Transfer Process

FIG. 10 is a flowchart of the USBX data delivery process, and illustrates operation of USB Remote Root Hub 230A. As FIG. 10 shows, in 1002 a determination may be made by the USB Remote Root Hub 230A whether there is an incoming packet from a device, such as a USB Hub or peripheral. The device may be a USB Hub, or function device in a USB network. The USB Remote Root Hub 230A continues to poll or watch for the packet as represented by the "no" path in 1002.

If there is an incoming packet from the device, then in 1004 the packet may be saved and passed to host 108A. In one embodiment, the host 108A may comprise USBX Controller 830 which receives the packet.

In 1006, after the incoming packet has been received, an acknowledgement (ACK) may be sent by the USB Remote Root Hub 230A to the device signaling that the packet was received. The device may operate as if the acknowledgement is from the host 108A, when in fact, it originates with the USB Remote Root Hub 230A which is local to the device. In this manner, time-out issues associated with long distances between the device and the host 108A may be avoided. More specifically, sending the ACK may compel the device to operate as if the transaction were a success, thus freeing the device to process further data, i.e. the device operates as if the ACK were from the host 108A, when in fact the USB Remote Root Hub 230A sent the ACK.

In 1008, a determination may be made whether an acknowledgement has been received from the host 108A indicating that the packet was received by the host 108A. If the acknowledgement from the host 108A has been received, then the USB Remote Root Hub 230A may wait for a next incoming packet, as shown in 1002. If the acknowledgement from the host 108A has not been received, then in 1010 the USB Remote Root Hub 230A may check for a time-out condition.

If a time-out has not occurred the USB Remote Root Hub 230A may continue to wait for the acknowledgement from the host 108A, as shown in 1008. When a time-out condition occurs, the transaction may be considered to have failed and, as indicated in 1012, the USB Remote Root Hub 230A may resend the packet to the host 108A.

In 1014, the USB Remote Root Hub 230 may check whether the packet has been resent to the host 108A for the third time. If not, then the USB Remote Root Hub 230A may continue to wait for the acknowledgement from the host 108A, as shown in 1008. If, on the other hand, the packet has been resent to the host 108A three times, then in 1016 an error routine may be called. The error routine may reset the system for fresh data, and the transaction may be considered a failure. In one embodiment, the transaction failure may be logged and/or reported to appropriate parties. In one embodiment, the maximum number of packet resends allowed may be greater or less than three.

Thus, in the process described above, the data packet may be held by the USB Remote Root Hub 230A for possible retransmission to the host 108A until the appropriate response is received from the host 108A. The retransmissions to the host 108A (in response to a reception failure) may be made independently of source (device) conditions or activity. Furthermore, the process effectively circumvents the time-out characteristic of the source return to achieve the operational characteristics of a longer source time-out interval.

FIG. 11 A: Detailed Diagram Of One Embodiment Of A System

Figure 11A:
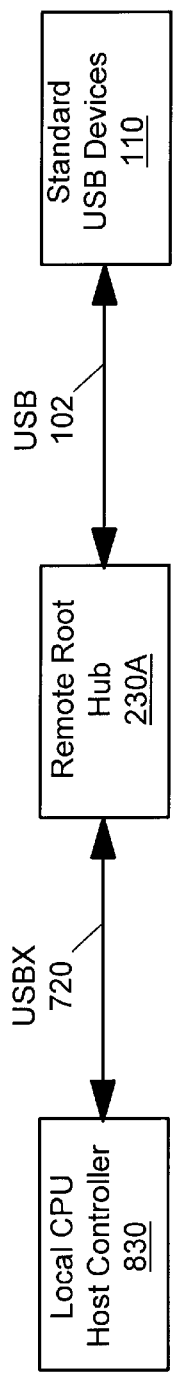
FIG. 11A is a detailed diagram of one embodiment of a system.

FIG. 11A illustrates further details of one embodiment of a system. In particular, a technique of making a USB Remote Root Hub 230A Port local to the USB devices 110 and remote from the host computer 108A is shown. In this technique the close proximity of subsequent USB Hubs or the Functional USB devices 110 themselves may assure handshaking acknowledgement within the time out period specified for USB. The USB Remote Root Hub 230A may thus be responsible for guaranteed packet delivery to the local CPU.

As FIG. 11A Section A shows, a local CPU host controller 830 may be connected to a USB Remote Root Hub 230A via a connection running a modified USB protocol, i.e., USBX 720. The USB Remote Root Hub 230A may then provide the Root Hub Port of the USB network.

Figure 11B:
FIG. 11B is a block diagram of an architecture of a remote hub.

FIG. 11B: Architecture of A Remote Root Hub

FIG. 11B illustrates a general architecture of USB Remote Root Hub 230A in block diagram form. The USB Remote Root Hub 230A may manage two serial interfaces. The first connects the USB Remote Root Hub 230A to the local CPU/Host Controller 830, shown as Serial Interface Engine 1102A. In one embodiment, the interface 1102A may use the USBX protocol. The second serial interface is the standard USB Root Hub protocol, shown as Serial Interface Engine 1102B. In general packets flow from interface 1102A to interface 1102B with only minor changes required by the USB Remote Root Hub 230A. These minor changes may be made by the Buffer, Memory, and Processor shown in 1104. A pair of lines, each running at 24 megabits per second may provide the linkage between the PC Host Controller 830 and the USB Remote Root Hub 230A.

Figure 12:
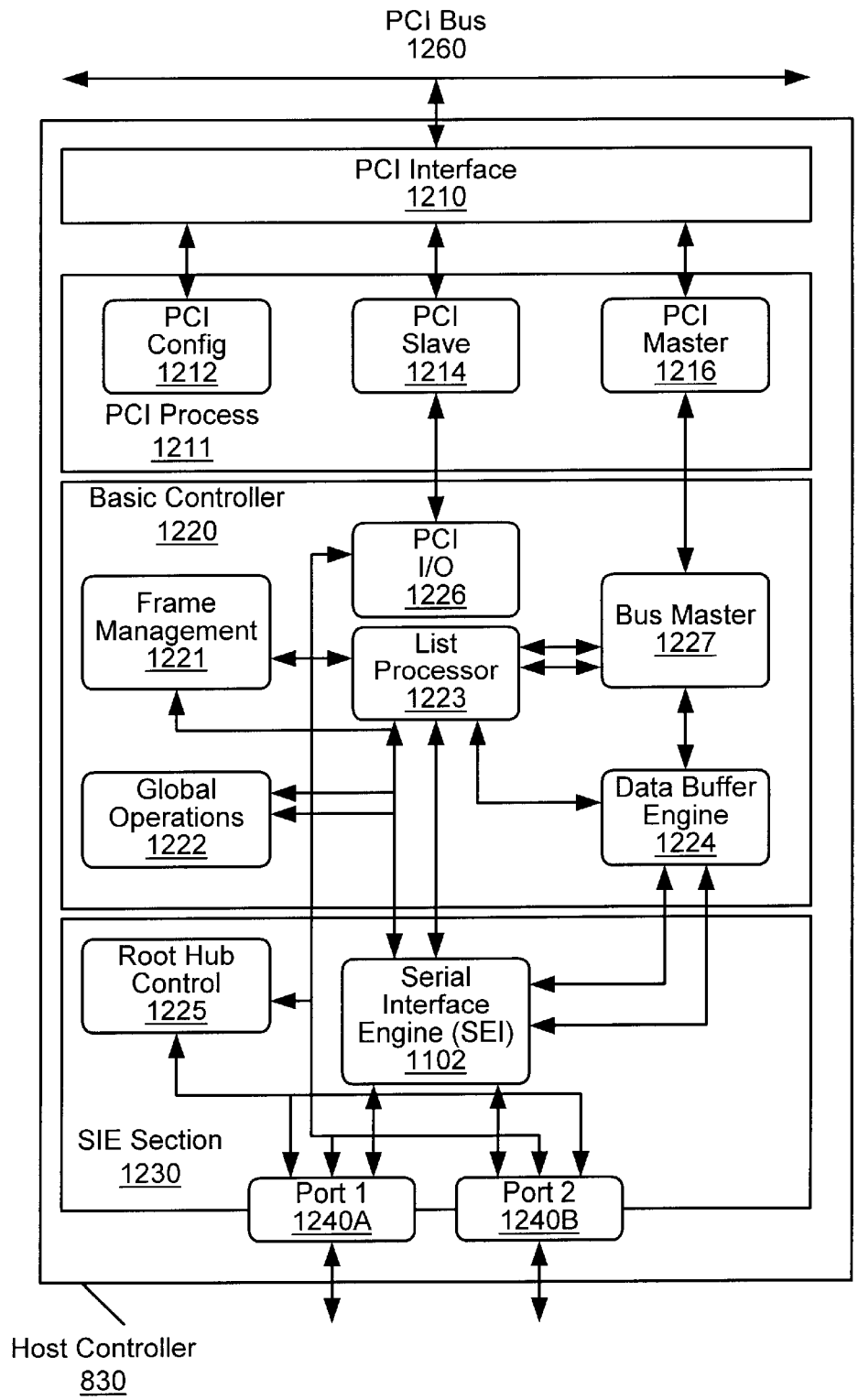
FIG. 12 is a detailed diagram of a host controller.

FIG. 12: A Block And Flow Diagram Of A Host Controller

FIG. 12 illustrates host controller 830. As FIG. 12 shows, host controller 830 may include the following primary elements: PCI interface 1210 and process 1211, basic controller 1220, and serial interface engine (SE) section 1230. The PCI Interface 1210 may couple to a PCI Bus 1260, as well as to a PCI configuration module 1212, a PCI slave module 1214, and a PCI master module 1216, which may manage PCI interactions between the host controller 830 and the PCI bus 1260. The PCI interface 1210 and process 1211 may be coupled to the basic controller 1220 through a PCI I/O module 1226 and a bus master 1227. The basic controller 1220 modules may all be directly or indirectly coupled to SIE 1102 and ports 1240A and 1240B. The SE module 1102 may be further coupled to ports 1240A and 1240B, as well as the root hub control 1225.

The processes that affect the timing issue may be located in the SIE 1102. Note that the SEI may communicate directly with the basic controller 1220 modules of frame management 1221, global operators 1222, list processor 1223, and data builder engine 1224. Ports 1240A and 1240B may be directly coupled with the SE 1102, root hub control 1225, and PCI I/O module 1226.

Figure 13:
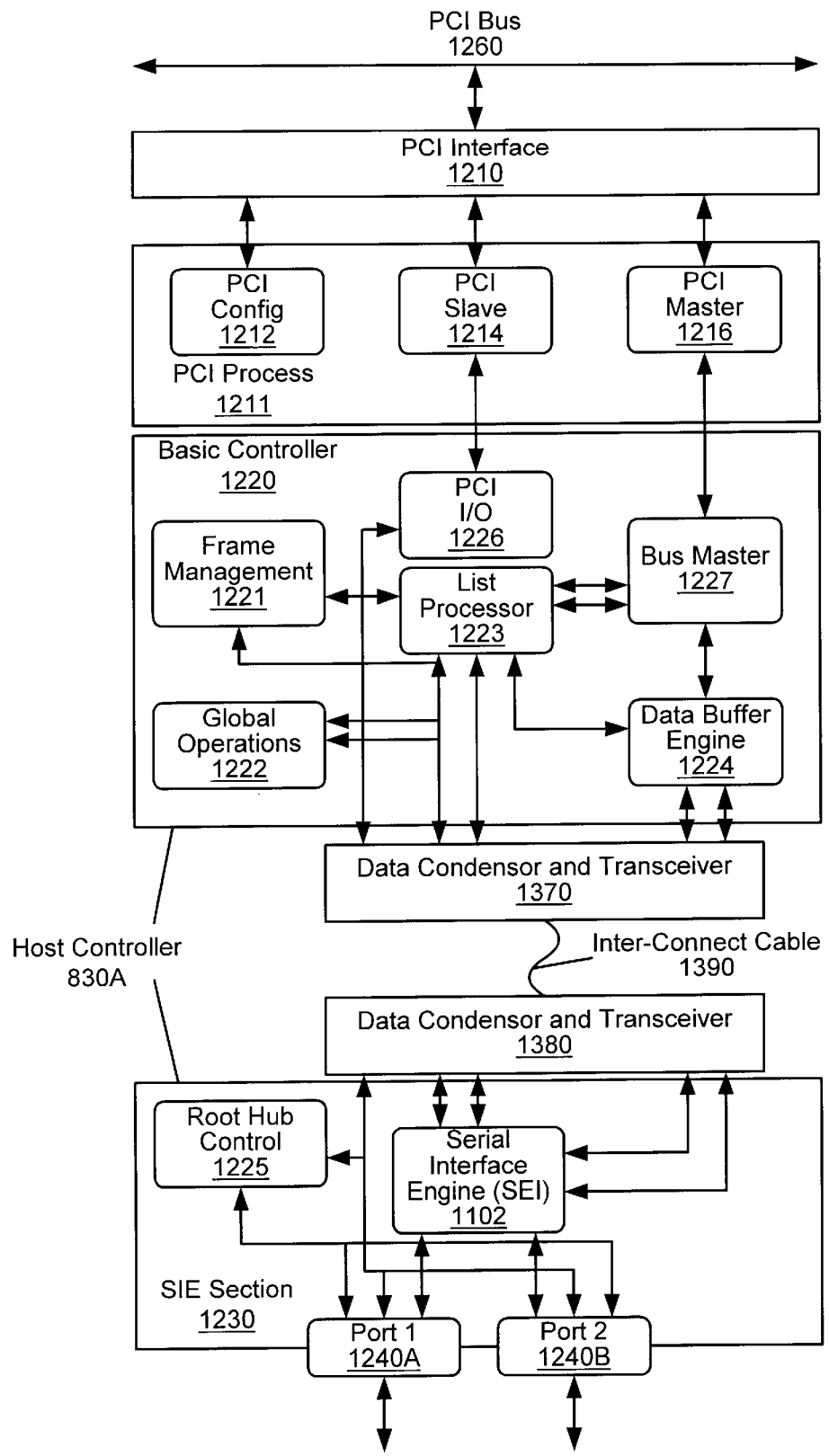
FIG. 13 illustrates separation of a serial interface engine from the remainder of a host controller.

FIG. 13: A Block And Flow Diagram Of A Host Controller With A Separated Serial Interface Engine FIG. 13 illustrates host controller 830A. As FIG. 13 shows, the basic controller 1220 and the SE section 1230 may be separated but coupled to each other through a data condenser 1370 and data transceiver 1380, which may themselves be coupled through an interconnect cable 1390.

The data condensers 1370 and transceivers 1380 section may be located such that the data and control lines may be interrupted at a point which may make timing with respect to the outside world unimportant. Rather, only timing with respect to the relative data and control signals may be considered important. This approach may entail an actual split in the process flow of the standard USB interface as defined by the USB standard 1.0. The addition of the data condensers and transceivers may not alter the standard or its performance but may simply augment the distance that the signal may be sent.

The condenser 1370 and transceiver 1380 process may include organizing the data to be transferred between the two modular sections of the host controller 830A and sending the data in both directions using an amplitude domain modulation process. In one embodiment, multiple individual asynchronous data streams may be combined for simultaneous transmission via a single conductor. In one embodiment, a carrier signal may be modulated and demodulated on a half-cycle basis wherein each half-cycle is amplitude modulated (i.e., multiplied) by a fixed value representative of the data to be encoded. The fixed value may be applied to the half-cycle at zero-crossing and may be held steady for the duration of the half-cycle. In this manner, each half-cycle of a carrier signal may be modulated to contain data. For purposes of redundancy or security, two or more half-cycles may be used to contain the data, but in each case, the modulation still occurs on a half-cycle basis. For more detailed information regarding the data condenser/transceiver process please see co-pending U.S. patent application Ser. No. 09/179,809, filed Oct. 15, 1998, which is incorporated herein.

Thus, the system described above may accommodate the timing limitations of the USB specification while providing extended cabling distance beyond that specified by the USB specification. More specifically, the system may extend the operating distance of USB by interrupting the data and signal processing process just before the point of critical transmit-receive timing, and changing the construct of the data flow to a more appropriate form for long distance transport.

Figure 14:
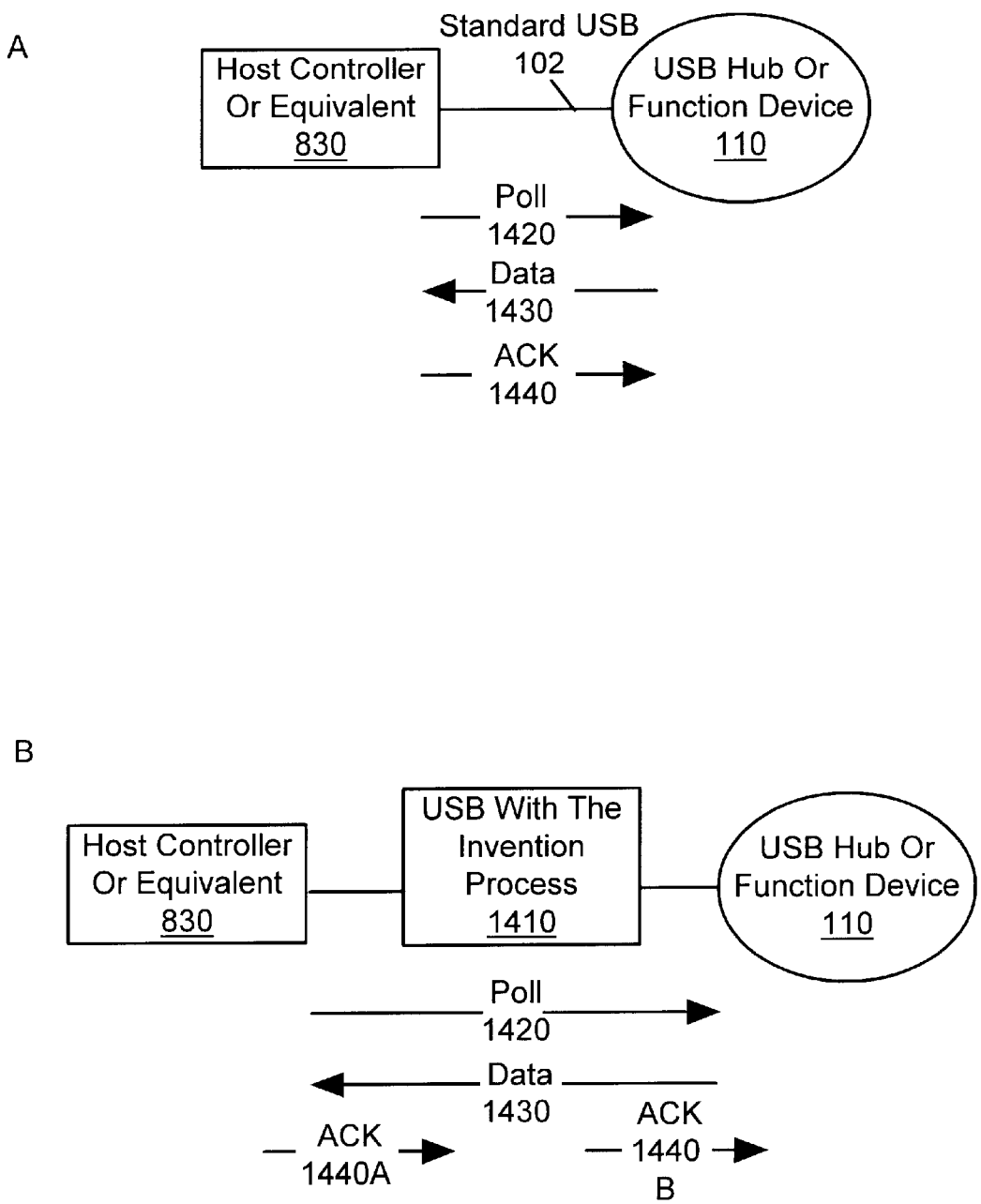
FIG. 14 illustrates the use of acknowledgements to avoid time-out limitations of USB.

FIG. 14: The Use Of Acknowledgements To Avoid Time-Out Limitations Of USB

In half-duplex timed response data transfer systems such as USB, typically a data source may launch a data packet and look for an acknowledgement of receipt of the data from the other end within a specified time interval. If this time interval is exceeded without the receipt of the acknowledgement then the transmitting unit may assume the transaction is a failure and initiate a repeat transmission of the same data. FIG. 14 illustrates a technique whereby acknowledgements may be used to prevent USB time-out errors related to long transmission distances. As 14A shows, in a standard USB communications system, after stimulation by polling 1420, a hub or function device 110 may send a data packet 1430 back to the host controller 830 or equivalent. This transmission to the host controller 830 may then stimulate a response back to the hub or function device 110 in the form of an acknowledgement 1440. The acknowledgement must typically occur within a specified and limited time, according to the USB specification. The ACK informs the hub or function device 110 that the transmission transaction was successful and that the hub or function device 110 may proceed with the next activity. This characteristic may be utilized by various embodiments of the system and method to circumvent time-out issues. Specifically, as shown in 14B, by sending an immediate ACK to the hub or function device 110, and waiting for the ACK from the host controller 830, the system may allow the hub or function device 110 to operate as if it has successfully transmitted its data packet to the host controller 830 even though the data packet may not actually have been received and qualified by the host controller 830. Additionally, in order to accommodate errors in the transmission process between the hub or function device 110 and the host controller 830, in one embodiment, the system may retain a copy of the data packet to assure retransmission of the data packet in such an event.

Figure 15:
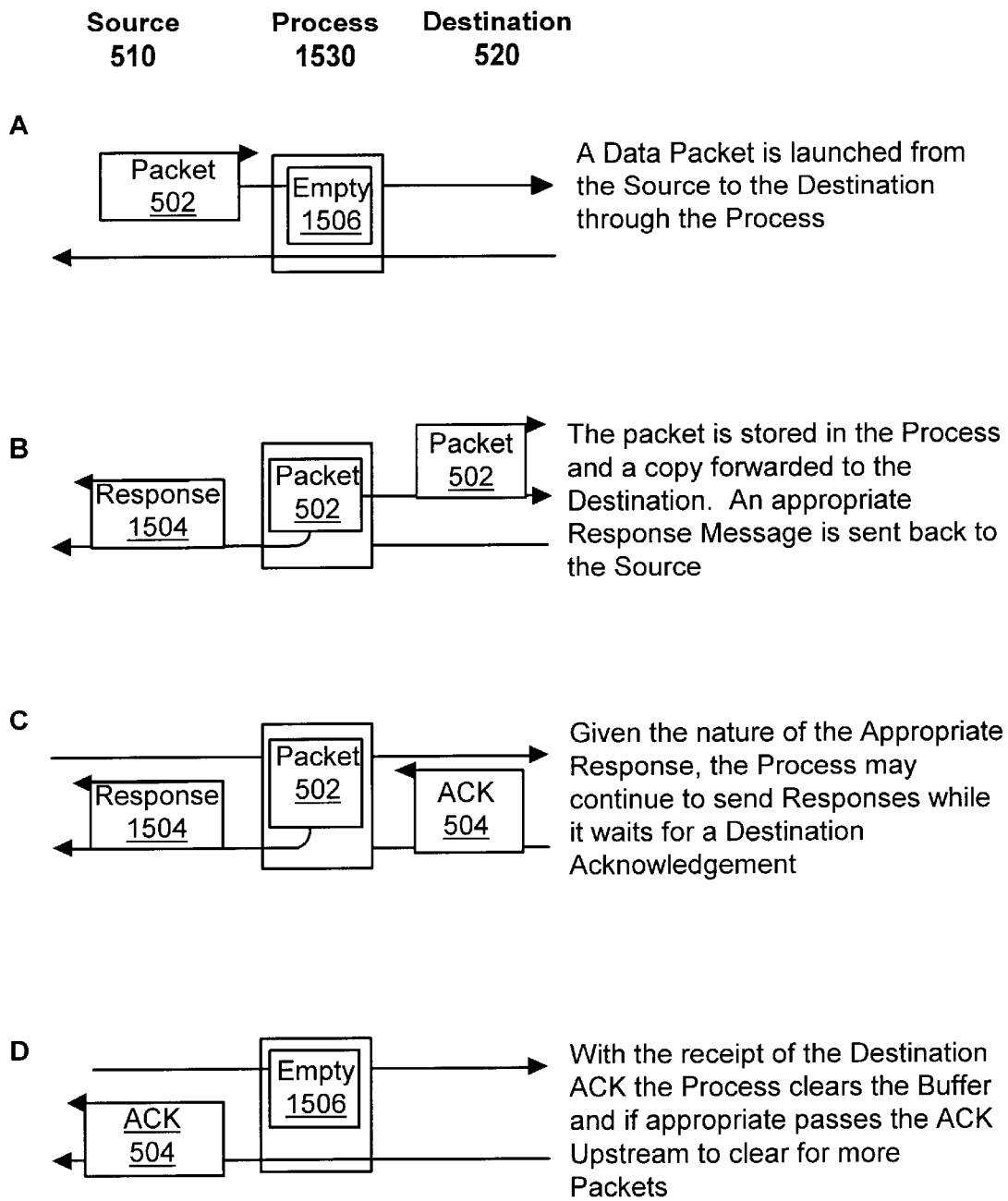
FIG. 15: illustrates the use of acknowledgements to avoid USB time-out limitations.

FIG. 15: The Use Of Acknowledgements To Avoid Time-Out Limitations Of USB

FIG. 15 illustrates an approach whereby transmissions between a USB source and a USB destination may be intercepted by a process 1530 and manipulated to avoid time-out limitations of standard USB, as described in the USB specification. As FIG. 15 shows, in diagram A, source 510 may launch a data packet 502 to destination 530. Process 1530 may include a buffer which is shown by diagram A to be empty 1506. The Process 1530 may wait for an incoming packet of data from the source 510. In one embodiment, the source may be a hub or function device 110 in the USB network.

As may be seen in diagram B, the packet 502 may be stored in the process 1530 buffer, after which a copy of the packet may be forwarded to the destination 520. The process 1530 may then send a response message 1504 to the source 510, indicating that the packet 502 has been sent successfully. The response 1504 may be any message that prevents the source 510 from sensing an error state and refusing to send the next sequential packet, which is typically a specific acknowledge packet.

As diagram C shows, depending on the nature of the response message 1504, the process 1530 may continue to send responses while waiting for an ACK 504 from the destination 520. Once the destination 520 receives the data packet 502 the destination 520 may either issue an ACK if the reception was successful, or a request for retransmission if there was a receive problem. If the process 1530 receives the request for retransmission then the process 1530 may send the contents of the buffer again and wait for a response. If the destination 520 successfully receives the data packet 502, then an ACK may be issued.

Finally, as shown in diagram D of FIG. 15, upon receipt of the destination ACK 504, the process 1530 may clear the process buffer 1506 and, if appropriate, pass the ACK 504 upstream to the source 510 to clear for more packets, i.e., the system may be reset for the next data packet.

Figure 16:
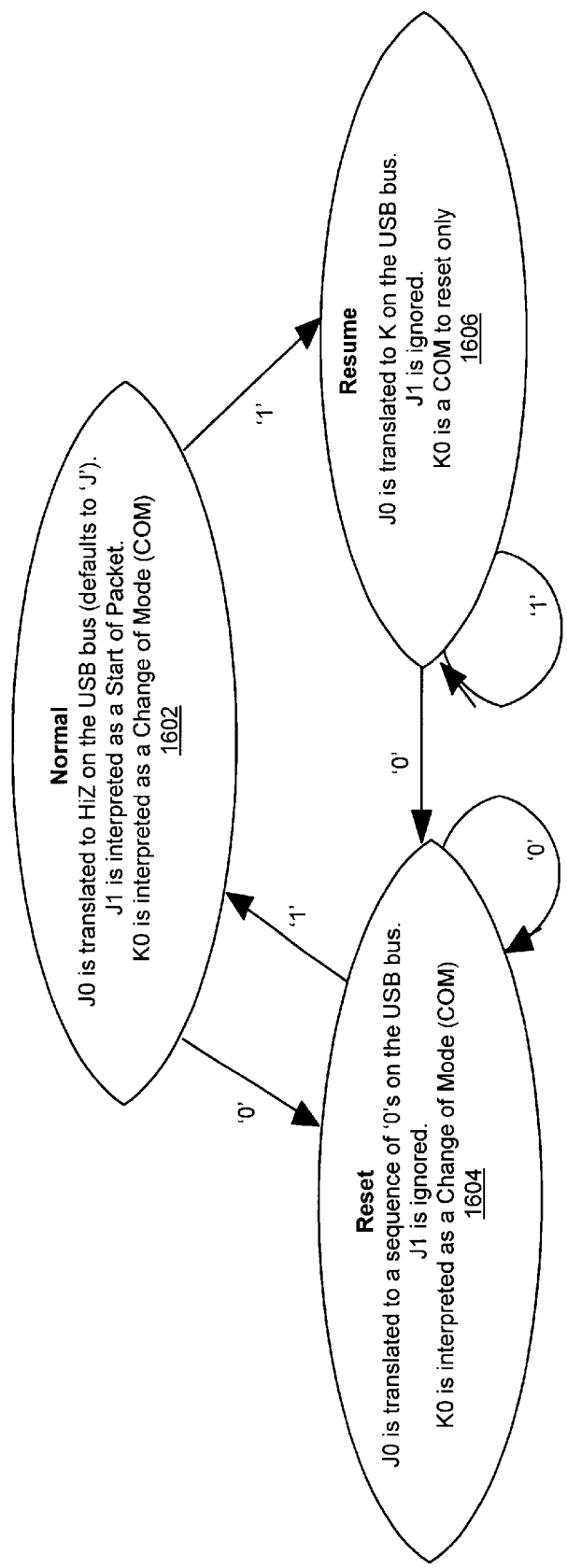
FIG. 16: illustrates USBX process control states and transitions.

FIG. 16: USBX Process Control States And Transitions

Standard USB operations include the transmission of J and K symbols. USB typically operates at one of two speeds: a low speed (1.5 mBit) wherein a J symbol is a low state and the K symbol is a high state, and a high speed, wherein the states are inverted, that is a J symbol is the high state in the wire, and the K symbol is the low state.
The flow of these symbols generally manages four control states in the process as follows:

Reset—A sequence of "0" s for more than 10 milliseconds

Suspend—A sequence of "J" symbols for more than 3 milliseconds

Resume—A sequence of "K" symbols for more than 20 milliseconds Operational—J (with an SOF (Start Of Frame) every 1 ms)

These commands may be translated into USBX as shown below. Note that bit values of "0" and "1" refer to low and high states, respectively. The USBX Operations include:

JØ—a string of 1,1,0,0 (two high bits, two low bits, which may form a single 12 mHz square wave segment)

J1—a string of 1,1,1,1 (four high bits in a row, which may form the high half of a 6 MHz square wave segment)

KØ—a string of 0,0,0,0 (four low bits in a row, which may form the low half of a 6 MHz square wave)

K1—a string of 0,0,1,1 (two low bits, two high bits, which may form a single 12 MHz square wave segment)

In the Standard USB protocol, a USB packet is typically only a series of J1 and KØ symbols. The general USBX commands include:

Idle state—continuous JØ (continuous 12 MHz square wave)

Mark start of USB Packet—J1

Make State of Change Request—KØ

Never used so as to not be confused with JØ—K1

FIG. 16 illustrates the process control states and their respective transitions. The state engine that operates the remote root hub 230A may be switched between normal 1602, reset 1604, and resume 1606 modes in the following way. As FIG. 16 shows, if the state engine is in normal mode 1602, then JØ may be translated to HiZ on the USB bus and defaults to "J". HiZ denotes a high impedance state which stabilizes a line when no data are being transmitted, thus preventing spurious currents from flowing through the line. J1 may be interpreted as a start of packet (SOP). Finally, K0 may be interpreted as a change of mode (COM). As FIG. 16 shows, a control command of "0" may cause a transition from normal mode 1602 to reset mode 1604, while a control command of "1" may cause a transition from normal mode 1602 to resume mode 1606.

When the state engine is in resume mode 1606, J0 may be translated to K on the USB bus, J1 may be ignored, and K0 may be a COM to reset only. As FIG. 16 shows, a control command of "1" may retain the resume mode 1606, while a control command of "0" may cause a transition from normal mode 1602 to reset mode 1604.

When the state engine is in reset mode 1604, J0 may be translated to a sequence of "0"s on the USB bus, J1 may be ignored, and K0 may be interpreted as a change of mode (COM). A control command of "0" may retain the reset mode 1604, while a control command of "1" may cause a transition from reset mode 1604 to normal mode 1602.

The translation of USB symbols into USBX symbols may provide a mechanism for transferring USB data over the USBX bus, and may allow the time dependent constraints in USB to be transferred to the Remote Root Hub.

In the USB system the Remote Hub 230 may need to know which packets are sent to and from isochronous endpoints. Isochronous endpoints typically do not use acknowledgements at all, as they are generally streaming data such as video and it would be inappropriate for the root hub to issue an ACK to these devices. To accommodate this need, the SYNC field in USBX may be modified. In USB the SYNC field is typically 8 bits in length and may be used to lock the respective clocks for decoding the data stream. In USBX this SYNC field may be modified to include information as to whether the data are isochronous or needing an ACK. Isochronous data may be sent with a SYNC field including 4 low-high symbols. In one embodiment, all other data may be sent with 3 pairs of low-high and a single low-low set. Thus, the USBX system may accommodate the transfer of both isochronous and non-isochronous data.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system for communicating data over a Universal Serial Bus (USB), the system comprising:
   a host computer system including a processor and a memory;
   a host controller coupled to the host computer system;
   a first bus which is coupled to the host controller;
   a USB Remote Root Hub which is coupled to the first bus, wherein the USB Remote Root Hub is further coupled to the USB; and
   at least one USB device, wherein the at least one USB device is coupled to the USB;
   wherein the host controller, the first bus, and the USB Remote Root Hub are operable to allow communication between the host computer system and the USB device over a distance which is greater than a maximum distance specified in a USB protocol specification.

2. The system of claim 1, wherein the host computer system comprises the host controller.

3. The system of claim 1,
   wherein the host controller, the first bus, and the USB Remote Root Hub are operable to allow communication between the host computer system and the USB device;
   wherein the first bus has a length greater than about 5 meters.

4. The system of claim 1,
   wherein the memory of the host computer system comprises a USB driver program, and wherein the processor in the host computer system is operable to execute the USB driver program.

5. The system of claim 1,
   wherein the host controller presents a USB compliant interface to the USB driver program.

6. The system of claim 1,
   wherein the memory of the host computer system comprises a USB driver program, and wherein the processor in the host computer system is operable to execute the USB driver program; and
   wherein the host controller presents a USB compliant interface to the USB driver program.

7. The system of claim 1, wherein the host controller and the first bus are substantially transparent to the USB driver program.

8. The system of claim 1, wherein the host controller and the first bus are substantially transparent to the USB Remote Root Hub.

9. The system of claim 1,
   wherein the USB Remote Root Hub is operable to:
      receive a data packet from the USB device through the USB bus;
      transmit the data packet to the host computer system after receiving the data packet; and
      send an acknowledgement (ACK) to the USB device after receiving the data packet.

10. The system of claim 9,
   wherein the host computer system is operable to transmit a host acknowledgement to the USB Remote Root Hub in response to the host computer system receiving the data packet transmitted from the USB Remote Root Hub.

11. The system of claim 10,
   wherein the USB Remote Root Hub is operable to send an acknowledgement (ACK) to the USB device prior to the USB Remote Root Hub receiving the host acknowledgement from the host computer system.

12. The system of claim 9,
   wherein the host computer system is operable to transmit a host acknowledgement to the USB Remote Root Hub in response to the host computer system successfully receiving the data packet from the USB Remote Root Hub;
   wherein the USB Remote Root Hub is operable to send an acknowledgement (ACK) to the USB device prior to the USB Remote Root Hub receiving the host acknowledgement from the host computer system.

13. The system of claim 12,
wherein, if the host acknowledgement is received from the host computer system before a time-out condition occurs, then the USB Remote Root Hub is operable to receive a subsequent data packet from the USB device.

14. The system of claim 12,
wherein, if the host acknowledgement is not received from the host computer system before the time-out condition occurs, then the USB Remote Root Hub is operable to re-send the data packet to the host computer system one or more times.

15. The system of claim 14,
wherein, if the host acknowledgement is not received from the host computer system after the USB Remote Root Hub re-sends the data packet to the host computer system a maximum number of times, the USB Remote Root Hub is operable to execute an error routine.

16. The system of claim 1,
wherein the USB device comprises one of a display device, a pointing device, a keyboard, a disc drive, an optical drive, a printer, a fax machine, a scanner, or a tape drive.

17. The system of claim 1, wherein the first bus is a USBX bus.

18. A method for communicating data over a remote Universal Serial Bus (USB), the method comprising:
receiving a data packet from a USB device through a USB bus;
transmitting the data packet to a host computer system over a first bus;
transmitting an acknowledgement (ACK) to the USB device over the USB bus, wherein said transmitting of the ACK to the USB device occurs prior to a host acknowledgement being received from the host computer system acknowledging receipt of the data packet;
wherein the first bus has a length greater than about 5 meters.

19. The method of claim 18,
wherein the first bus has a length greater than a maximum distance specified in a USB protocol specification.

20. The method of claim 18,
wherein the transmitting the data packet to the host computer system over the first bus comprises transmitting the data packet to a host controller, wherein the host controller is coupled to the host computer system.

21. The method of claim 20,
wherein the host computer system comprises the host controller.

22. The method of claim 18,
wherein the transmitting the data packet to the host computer system over the first bus comprises transmitting the data packet to a host controller, wherein the host controller is coupled to the host computer system; and
wherein the first bus has a length greater than a maximum distance specified in a USB protocol specification.

23. The method of claim 22,
wherein the host computer system comprises the host controller.

24. The method of claim 22,
wherein the host computer system comprises a processor and a memory, wherein the memory of the host computer system comprises a USB driver program, and wherein the processor in the host computer system is operable to execute the USB driver program.

25. The method of claim 24,
wherein the host controller presents a USB compliant interface to the USB driver program.

26. The method of claim 24,
wherein the host controller and the first bus are substantially transparent to the USB driver program.

27. The method of claim 22,
wherein the memory of the host computer system comprises a USB driver program, and wherein the processor in the host computer system is operable to execute the USB driver program; and
wherein the host controller presents a USB compliant interface to the USB driver program.

28. The method of claim 27, wherein the host controller and the first bus are substantially transparent to the USB driver program.

29. The method of claim 18,
wherein the host computer system comprises a processor and a memory, wherein the memory of the host computer system comprises a USB driver program, and wherein the processor in the host computer system is operable to execute the USB driver program.

30. The method of claim 18,
wherein the receiving of the data packet, the transmitting of the data packet, and the transmitting of the acknowledgement are performed by a USB Remote Root Hub, wherein the USB Remote Root Hub includes specialized logic to perform the receiving of the data packet, the transmitting of the data packet, and the transmitting of the acknowledgement.

31. The method of claim 18,
wherein the host controller and the first bus are substantially transparent to the USB Remote Root Hub.

32. The method of claim 18,
wherein the receiving of the data packet, the transmitting of the data packet, and the transmitting of the acknowledgement are performed by a USB Remote Root Hub, wherein the USB Remote Root Hub includes specialized logic to perform the receiving of the data packet, the transmitting of the data packet, and the transmitting of the acknowledgement; and
wherein the host controller and the first bus are substantially transparent to the USB Remote Root Hub.

33. The method of claim 18, further comprising:
receiving a subsequent data packet from the USB device if the host acknowledgement is received from the host computer system before a time-out condition occurs.

34. The method of claim 18, further comprising:
re-sending the data packet to the host computer system one or more times if the host acknowledgement is not received from the host computer system before a time-out condition occurs.

35. The method of claim 34, further comprising:
executing an error routine if the host acknowledgement is not received from the host computer system after re-sending the data packet to the host computer system a maximum number of times.

36. The method of claim 18,
wherein the USB device comprises one of a display device, a pointing device, a keyboard, a disc drive, an optical drive, a printer, a fax machine, a scanner, or a tape drive.

37. The method of claim 18, wherein the first bus is a USBX bus.

38. A method for communicating data over a remote Universal Serial Bus (USB), the method comprising:
  generating a data packet on the remote USB;
  receiving the data packet from the remote USB;
  transmitting the data packet to a host computer system over a first bus, wherein the first bus has a length greater than about 5 meters;
  transmitting an acknowledgement (ACK) to a USB device over the USB, wherein said transmitting the ACK to the USB device occurs prior to a host acknowledgement being received from a host computer system acknowledging receipt of the data packet.

39. The method of claim 38,
  wherein the generating the data packet on the remote USB is performed by the USB device.

40. The method of claim 38,
  wherein the USB device comprises one of a monitor, a mouse, a keyboard, a disc drive, an optical drive, a laser printer, an ASCII printer, a fax machine, a scanner, or a tape drive.

41. The method of claim 38,
  wherein the receiving the data packet from the remote USB is performed by a USB Remote Root Hub.

42. The method of claim 38,
  wherein the transmitting the data packet to a host computer system over a first bus is performed by a USB Remote Root Hub.

43. The method of claim 38,
  wherein the transmitting an acknowledgement (ACK) to the USB device over the USB is performed by a USB Remote Root Hub.

44. The method of claim 38, further comprising:
  waiting for an acknowledgement from the host computer system, wherein the acknowledgement indicates that the data packet has been received by the host computer system;
  if the acknowledgement has been received from the host computer system before a time-out condition occurs, then waiting for a next data packet from the USB device;
  if the acknowledgement has not been received from the host computer system before the time-out condition occurs, then re-sending the data packet to the host computer system;
  if the data packet has been re-sent to the host computer system a maximum number of times, then executing an error routine; and
  if the data packet has not been re-sent to the host computer system a maximum number of times, then continuing the waiting for the acknowledgement from the host computer system.

45. The method of claim 44,
  wherein the waiting for an acknowledgement from the host computer system is performed by a USB Remote Root Hub.

46. The method of claim 44,
  wherein the waiting for a next data packet from the device is performed by a USB Remote Root Hub.

47. The method of claim 44,
  wherein the re-sending the data packet to the host computer system is performed by a USB Remote Root Hub.

48. The method of claim 44,
  wherein the executing an error routine is performed by a USB Remote Root Hub.

49. The method of claim 44,
  wherein the continuing the waiting for the acknowledgement from the host computer system is performed by a USB Remote Root Hub.

50. The method of claim 44,
  wherein the waiting for an acknowledgement, the waiting for a next data packet, the re-sending the data packet, the executing an error routine, and the continuing the waiting for the acknowledgement from the host computer system is performed by a USB Remote Root Hub.

51. The method of claim 38,
  wherein the transmitting of the data packet to the host computer system comprises transmitting the data packet to a USB Extension (USBX) controller over a USBX bus, wherein the USBX controller is coupled to the host computer system, and wherein the USBX Controller and the USBX bus are operable to allow communication between the host computer system and a USB device over a distance which is greater than a maximum distance specified in a USB protocol specification.

52. The method of claim 51,
  wherein the host computer system comprises the USBX Controller.

53. The method of claim 51,
  wherein the host computer system comprises a processor and a memory, wherein the memory of the host computer system comprises a USB driver program, and wherein the processor in the host computer system is operable to execute the USB driver program.

54. The method of claim 53,
  wherein the USBX controller and the first bus are substantially transparent to the USB driver program.

55. The method of claim 53,
  wherein the USBX controller presents a USB compliant interface to the USB driver program.

56. The method of claim 51,
  wherein the host computer system comprises a processor and a memory, wherein the memory of the host computer system comprises a USB driver program, and wherein the processor in the host computer system is operable to execute the USB driver program; and
  wherein the USBX controller presents a USB compliant interface to the USB driver program.

57. The method of claim 38,
  wherein the first bus has a length greater than a maximum distance specified in a USB protocol specification.

58. The method of claim 38,
  wherein the host computer system comprises a processor and a memory, wherein the memory of the host computer system comprises a USB driver program, and wherein the processor in the host computer system is operable to execute the USB driver program.

59. The method of claim 38,
  wherein the receiving of the data packet, the transmitting of the data packet, and the transmitting of the acknowledgement are performed by a USB Remote Root Hub, wherein the USB Remote Root Hub includes specialized logic to perform the receiving of the data packet, the transmitting of the data packet, and the transmitting of the acknowledgement.

60. The method of claim 38, wherein the first bus is a USBX bus.

61. A system for communicating data over a Universal Serial Bus (USB), the system comprising:
- a host computer system including a processor and a memory;
- a host controller coupled to the host computer system;
- a first bus which is coupled to the host controller;
- a USB Remote Root Hub which is coupled to the first bus, wherein the USB Remote Root Hub is further coupled to the USB; and
- at least one USB device, wherein the at least one USB device is coupled to the USB;
- wherein the host controller, the first bus, and the USB Remote Root Hub are operable to allow communication between the host computer system and the USB device;
- wherein the first bus has a length greater than about 5 meters.

62. The system of claim 61,
- wherein the memory of the host computer system comprises a USB driver program, and wherein the processor in the host computer system is operable to execute the USB driver program; and
- wherein the host controller presents a USB compliant interface to the USB driver program.

63. The system of claim 61, wherein the host controller and the first bus are substantially transparent to the USB driver program.

64. The system of claim 61, wherein the host controller and the first bus are substantially transparent to the USB Remote Root Hub.

65. The system of claim 61,
- wherein the USB Remote Root Hub is operable to:
  - receive a data packet from the USB device through the USB bus;
  - transmit the data packet to the host computer system after receiving the data packet; and
  - send an acknowledgement (ACK) to the USB device after receiving the data packet;
- wherein the host computer system is operable to transmit a host acknowledgement to the USB Remote Root Hub in response to the host computer system receiving the data packet transmitted from the USB Remote Root Hub;
- wherein the USB Remote Root Hub is operable to send an acknowledgement (ACK) to the USB device prior to the USB Remote Root Hub receiving the host acknowledgement from the host computer system.

66. A system for communicating data over a Universal Serial Bus (USB), the system comprising:
- a host computer system including a processor and a memory, wherein the memory of the host computer system comprises a USB driver program, and wherein the processor in the host computer system is operable to execute the USB driver program;
- a host controller coupled to the host computer system;
- a first bus which is coupled to the host controller;
- a USB Remote Root Hub which is coupled to the first bus, wherein the USB Remote Root Hub is further coupled to the USB; and
- at least one USB device, wherein the at least one USB device is coupled to the USB.

67. The system of claim 66,
- wherein the host controller presents a USB compliant interface to the USB driver program.

68. The system of claim 66, wherein the host controller and the first bus are substantially transparent to the USB driver program.

69. The system of claim 66, wherein the host controller and the first bus are substantially transparent to the USB Remote Root Hub.

70. The system of claim 66,
- wherein the USB Remote Root Hub is operable to:
  - receive a data packet from the USB device through the USB bus;
  - transmit the data packet to the host computer system after receiving the data packet; and
  - send an acknowledgement (ACK) to the USB device after receiving the data packet;
- wherein the host computer system is operable to transmit a host acknowledgement to the USB Remote Root Hub in response to the host computer system receiving the data packet transmitted from the USB Remote Root Hub;
- wherein the USB Remote Root Hub is operable to send an acknowledgement (ACK) to the USB device prior to the USB Remote Root Hub receiving the host acknowledgement from the host computer system.

71. A system for communicating data over a Universal Serial Bus (USB), the system comprising:
- a host computer system including a processor and a memory;
- a host controller coupled to the host computer system;
- a first bus which is coupled to the host controller;
- a USB Remote Root Hub which is coupled to the first bus, wherein the USB Remote Root Hub is further coupled to the USB; and
- at least one USB device, wherein the at least one USB device is coupled to the USB;
- wherein the USB Remote Root Hub is operable to:
  - receive a data packet from the USB device through the USB bus;
  - transmit the data packet to the host computer system after receiving the data packet; and
  - send an acknowledgement (ACK) to the USB device after receiving the data packet.

72. A method for communicating data over a remote Universal Serial Bus (USB), the method comprising:
- receiving a data packet from a USB device through a USB bus;
- transmitting the data packet to a host computer system over a first bus;
- transmitting an acknowledgement (ACK) to the USB device over the USB bus, wherein said transmitting of the ACK to the USB device occurs prior to a host acknowledgement being received from the host computer system acknowledging receipt of the data packet;
- wherein the receiving of the data packet, the transmitting of the data packet, and the transmitting of the acknowledgement are performed by a USB Remote Root Hub, wherein the USB Remote Root Hub includes specialized logic to perform the receiving of the data packet, the transmitting of the data packet, and the transmitting of the acknowledgement; and
- wherein the host controller and the first bus are substantially transparent to the USB Remote Root Hub.

* * * * *